United States Patent
Miyake

(10) Patent No.: US 10,262,570 B2
(45) Date of Patent: Apr. 16, 2019

(54) SEMICONDUCTOR DEVICE AND METHOD FOR DRIVING THE SAME

(71) Applicant: SEMICONDUCTOR ENERGY LABORATORY CO., LTD., Atsugi-shi, Kanagawa-ken (JP)

(72) Inventor: Hiroyuki Miyake, Tochigi (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 304 days.

(21) Appl. No.: 15/056,279

(22) Filed: Feb. 29, 2016

(65) Prior Publication Data
US 2016/0260373 A1 Sep. 8, 2016

(30) Foreign Application Priority Data
Mar. 5, 2015 (JP) ................................. 2015-043113

(51) Int. Cl.
G09G 3/20 (2006.01)
G09G 3/3233 (2016.01)
H05B 33/08 (2006.01)

(52) U.S. Cl.
CPC .......... *G09G 3/2007* (2013.01); *G09G 3/3233* (2013.01); *H05B 33/0896* (2013.01);
(Continued)

(58) Field of Classification Search
CPC ............ G09G 3/2007; G09G 3/32337; G09G 2300/0417
See application file for complete search history.

(56) References Cited

U.S. PATENT DOCUMENTS 6,462,723 B1 10/2002 Yamazaki et al.
6,952,023 B2 10/2005 Yamazaki et al.
(Continued)

FOREIGN PATENT DOCUMENTS

JP 2006-197532 7/2006

*Primary Examiner* — Robert J Michaud
(74) *Attorney, Agent, or Firm* — Nixon Peabody LLP; Jeffrey L. Costellia

(57) ABSTRACT

A semiconductor device includes a transistor including a first gate (front gate) and a second gate (back gate) overlapping with each other with a semiconductor film therebetween, and a display element. The transistor and the display element are electrically connected to each other. The first gate is supplied with one of $2^{N-k}$ potentials. The second gate is supplied with one of $2^k$ potentials. One of $2^{N-k}$ potentials and one of $2^k$ potentials are obtained in such a manner that N-bit digital data is divided into (N−k)-bit digital data and k-bit digital data and they are subjected to D/A conversion. At this time, the total number of gray level power supply lines used for D/A conversion is equal to the sum of $2^{N-k}$ and $2^k$. This is smaller than $2^N$, which the total number of the gray level power supply lines usually needed for D/A conversion of N-bit digital data.

10 Claims, 21 Drawing Sheets

(52) U.S. Cl.
CPC ........... *G09G 2300/0417* (2013.01); *G09G 2300/0828* (2013.01); *G09G 2310/027* (2013.01); *G09G 2310/0262* (2013.01); *G09G 2320/045* (2013.01)

(56) References Cited

U.S. PATENT DOCUMENTS

| | | | |
|---|---|---|---|
| 7,369,075 B2 | 5/2008 | Ishii et al. | |
| 8,212,488 B2 | 7/2012 | Osame et al. | |
| 8,737,109 B2 | 5/2014 | Yamazaki et al. | |
| 9,047,836 B2 | 6/2015 | Koyama | |
| 2006/0132344 A1* | 6/2006 | Ishii | H03M 1/76 341/144 |
| 2010/0134528 A1* | 6/2010 | Kim | G09G 3/3688 345/690 |
| 2013/0063413 A1 | 3/2013 | Miyake | |
| 2013/0069068 A1 | 3/2013 | Miyake | |
| 2013/0207102 A1 | 8/2013 | Miyake et al. | |
| 2014/0168194 A1* | 6/2014 | Kong | G09G 3/3233 345/212 |

* cited by examiner

600E

600E

600E

SEMICONDUCTOR DEVICE AND METHOD FOR DRIVING THE SAME

BACKGROUND OF THE INVENTION

1. Field of the Invention

One embodiment of the present invention relates to a semiconductor device and an electronic device including a display device, or a driving method thereof.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a liquid crystal display device, a light-emitting device, a lighting device, a power storage device, a memory device, a method for driving any of them, and a method for manufacturing any of them.

2. Description of the Related Art

An organic electroluminescent display device (hereinafter also referred to as OLED) is an example of a display device included in a semiconductor device. An image can be displayed on an OLED in such a manner that the gray level value of a display element in a display portion is controlled. Therefore, when the gray level of a video signal is higher, a higher-quality image can be obtained.

In order to increase the gray level of a video signal, a difference in potential supplied to a gate of a driving transistor should be small. In a source signal line driver circuit for driving a display device, a potential for displaying an image is selected from among a plurality of gray level power supply lines with the use of a D/A converter. In the case of a D/A converter using gray level power supply lines, the number of the gray level power supply lines needs to be the same as the obtained gray level; thus, the higher the gray level of a video signal is, the larger the number of the gray level power supply lines becomes (see FIG. 5A). As a result, the display device and the semiconductor device increase in size.

In recent years, the demand for higher image quality has been increased, and a semiconductor device with higher image quality, smaller size, and lower cost has been required.

Patent Document 1 discloses a structure in which two input potentials selected by a selection circuit are input to an amplifier circuit and a multilevel potential is output from the amplifier circuit.

REFERENCE

Patent Document

[Patent Document 1] Japanese Published Patent Application No. 2006-197532

SUMMARY OF THE INVENTION

In view of the above technical background, one embodiment of the present invention provides a novel structure with which the size of a semiconductor device can be small even when the image quality is increased and the cost can be low.

An object of one embodiment of the present invention is to reduce the number of gray level power supply lines. Another object of one embodiment of the present invention is to reduce the size of a D/A converter. Another object of one embodiment of the present invention is to reduce the size of a display device. Another object of one embodiment of the present invention is to reduce the size of a semiconductor device. Another object of one embodiment of the present invention is to provide a novel semiconductor device, a novel display device, or a novel light-emitting device. Another object of one embodiment of the present invention is to provide a method for driving a novel D/A converter. Another object of one embodiment of the present invention is to provide a method for driving a novel display device. Another object of one embodiment of the present invention is to provide a method for driving a novel semiconductor device.

Another object of one embodiment of the present invention is to display an N-bit (N is an integer greater than or equal to 1) signal with gray level power supply lines the number of which is smaller than $2^N$, which is usually needed for supplying an N-bit signal.

Note that the descriptions of these objects do not disturb the existence of other objects. In one embodiment of the present invention, there is no need to achieve all the objects. Other objects will be apparent from and can be derived from the description of the specification, the drawings, the claims, and the like.

A semiconductor device of one embodiment of the present invention includes a transistor including a first gate and a second gate overlapping with each other with a semiconductor film therebetween; and a display element. The transistor and the display element are electrically connected to each other. The first gate is supplied with one of $2^{N-k}$ potentials. The second gate is supplied with one of $2^k$ potentials. Here, N is an integer greater than or equal to 1, and k is an integer greater than or equal to 1 and less than or equal to (N−1).

A semiconductor device of one embodiment of the present invention includes a first D/A converter; a second D/A converter; and a plurality of pixels. The plurality of pixels each include a first transistor; a second transistor; a third transistor including a first gate and a second gate overlapping with each other with a semiconductor film therebetween; and a display element. The third transistor and the display element are electrically connected to each other. The first D/A converter is configured to output $2^{N-k}$ potentials. The second D/A converter is configured to output $2^k$ potentials. An output from the first D/A converter is supplied to the first gate through the first transistor. An output from the second D/A converter is supplied to the second gate through the second transistor. Here, N is an integer greater than or equal to 1, and k is an integer greater than or equal to 1 and less than or equal to (N−1).

A method for driving a semiconductor device of one embodiment of the present invention includes the steps of supplying a first potential to a first gate of a transistor, the first potential being one of $2^{N-k}$ potentials; supplying a second potential to a second gate overlapping with the first gate with a semiconductor film of the transistor therebetween, the second potential being one of $2^k$ potentials; and controlling a gray level value of a display element connected to the transistor by the first potential and the second potential. Here, N is an integer greater than or equal to 1, and k is an integer greater than or equal to 1 and less than or equal to (N−1).

According to one embodiment of the present invention, the number of gray level power supply lines can be reduced while the gray level of a semiconductor device is not reduced. According to one embodiment of the present invention, the size of a D/A converter can be reduced while the gray level of a semiconductor device is not reduced. According to one embodiment of the present invention, the size of a display device or a semiconductor device can be reduced. According to one embodiment of the present invention, a novel semiconductor device, a novel display device, or a novel light-emitting device can be provided. According to one embodiment of the present invention, a method for driving a novel D/A converter, a novel display device, or a novel semiconductor device can be provided. Note that the description of these effects does not disturb the existence of other effects. One embodiment of the present invention does not necessarily achieve all the effects listed above. Other effects will be apparent from and can be derived from the description of the specification, the drawings, the claims, and the like.

DETAILED DESCRIPTION OF THE INVENTION

Figure 1:
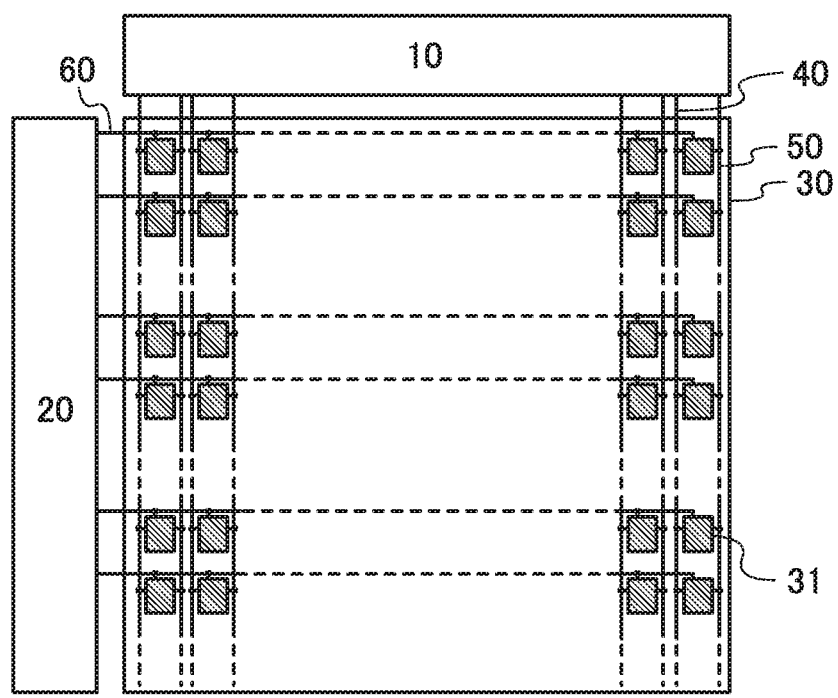
FIG. 1 illustrates a structure example of a semiconductor device.

Embodiments of the present invention will be described below in detail with reference to the drawings. Note that the present invention is not limited to the following description and it is easily understood by those skilled in the art that the mode and details can be variously changed without departing from the scope and spirit of the present invention. Therefore, the present invention should not be construed as being limited to the description of the embodiments below.

Note that the position, size, range, or the like of each component illustrated in drawings and the like is not accurately represented in some cases for easy understanding. Therefore, the disclosed invention is not necessarily limited to the position, size, range, or the like disclosed in the drawings and the like.

In this specification and the like, ordinal numbers such as first, second, and third are used in order to avoid confusion among components, and the terms do not limit the components numerically.

(Embodiment 1)

In this embodiment, a semiconductor device of one embodiment of the present invention will be described with reference to FIG. 1, FIGS. 2A and 2B, FIGS. 3A and 3B, FIGS. 4A and 4B, and FIGS. 5A and 5B.

<Structure Example 1>

FIG. 1 shows the structure of a semiconductor device of this embodiment. The semiconductor device in FIG. 1 includes a driver circuit 10, a driver circuit 20, and a pixel portion 30. The pixel portion 30 includes a plurality of pixels 31. The driver circuit 10 is connected to wirings 40 and 50, and the wirings 40 and 50 are each connected to the pixels 31 in the pixel portion 30. In the example of FIG. 1, the number of wirings connected to one pixel is two; however, it may be one, or three or more. The driver circuit 20 is connected to wirings 60, and the wirings 60 are each connected to the pixels 31 in the pixel portion 30. In the example of FIG. 1, the number of wirings connected to one pixel is one; however, it may be two or more. Furthermore, in the example of FIG. 1, the number of driver circuits is two; however, it may be three or more.

The driver circuit 10 and the driver circuit 20 are each a gate signal line driver circuit or a source signal line driver circuit, for example. Note that the driver circuit 10 and the driver circuit 20 may each be a driver circuit that controls the operation of the function of the pixels 31 depending on the function of the pixels 31. The driver circuit 10 and the driver circuit 20 may include one or more D/A converters or protection circuits, for example. In this embodiment, the driver circuit 20 is a source signal line driver circuit including a plurality of D/A converters, for example.

Figure 2A:
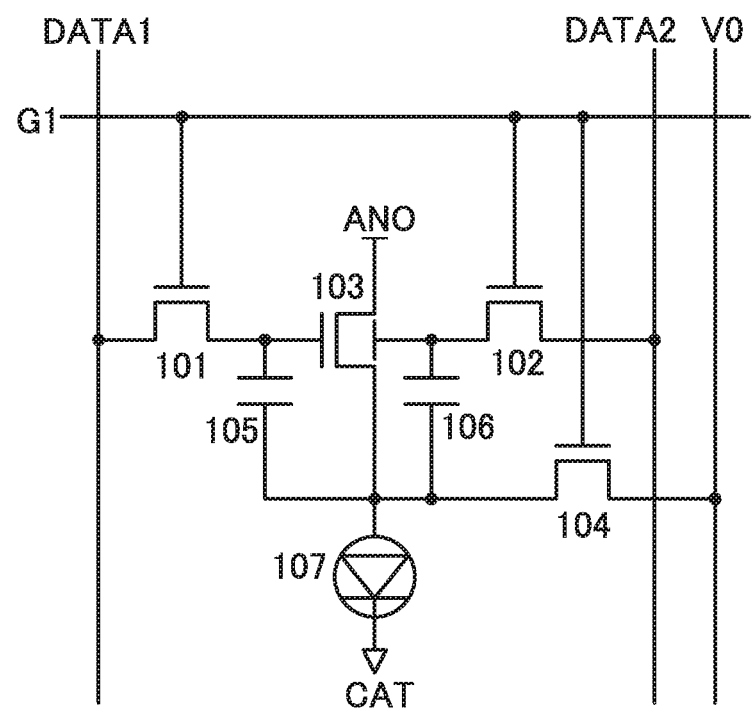
FIGS. 2A and 2B are a diagram illustrating a circuit example of a pixel and a timing chart.

FIG. 2A illustrates an example of the pixel 31 in FIG. 1. The pixel 31 illustrated in FIG. 2A includes a first transistor 101, a second transistor 102, a third transistor 103, a fourth transistor 104, a first capacitor 105, a second capacitor 106, and a display element 107. The third transistor 103 includes a first gate and a second gate overlapping with each other with a semiconductor film therebetween. The first transistor 101, the second transistor 102, and the fourth transistor 104 may each include one or more gates; for example, they may include two gates overlapping with each other with a semiconductor layer therebetween.

A gate of the first transistor 101 is electrically connected to a wiring G1, one of a source and a drain of the first transistor 101 is electrically connected to a wiring DATA1, and the other of the source and the drain of the first transistor 101 is electrically connected to the first gate of the third transistor 103. The first gate of the third transistor 103 is connected to the wiring DATA1 through the first transistor 101, and is supplied with a signal input to the wiring DATA1. In this embodiment, the wiring G1 is connected to the driver circuit 20 illustrated in FIG. 1, and the wiring DATA1 is connected to the driver circuit 10 illustrated in FIG. 1.

A gate of the second transistor 102 is electrically connected to the wiring G1, one of a source and a drain of the second transistor 102 is electrically connected to a wiring DATA2, and the other of the source and the drain of the second transistor 102 is electrically connected to the second gate of the third transistor 103. The second gate of the third transistor 103 is connected to the wiring DATA2 through the second transistor 102, and is supplied with a signal input to the wiring DATA2. In this embodiment, the wiring DATA2 is connected to the driver circuit 10 illustrated in FIG. 1.

One of a source and a drain of the third transistor 103 is connected to a wiring ANO. The wiring ANO may be a power supply line through which a fixed potential is supplied. The other of the source and the drain of the third transistor 103 is electrically connected to one of electrodes of the display element 107. The other electrode of the display element 107 is connected to a wiring CAT. Voltage may be generated between the wiring ANO and the wiring CAT.

The emission intensity of the display element 107 is changed according to a current supplied to the display element 107. The current supplied to the display element 107 is equivalent to a source-drain current of the third transistor 103, which flows in response to signals supplied to the first gate and the second gate of the third transistor 103. In other words, the gray level value of a display image signal of the display element 107 is controlled by both the signal input to the wiring DATA1 and the signal input to the wiring DATA2.

A gate of the fourth transistor 104 is electrically connected to the wiring G1, one of a source and a drain of the fourth transistor 104 is electrically connected to a wiring V0, and the other of the source and the drain of the fourth transistor 104 is electrically connected to the other of the source and the drain of the third transistor 103. The wiring V0 may be a power supply line through which a fixed potential is supplied. As the fixed potential, for example, a ground potential can be employed.

One of electrodes of the first capacitor 105 is electrically connected to the first gate of the third transistor 103, and the other electrode of the first capacitor 105 is electrically connected to the other of the source and the drain of the third transistor 103.

One of electrodes of the second capacitor 106 is electrically connected to the second gate of the third transistor 103, and the other electrode of the second capacitor 106 is electrically connected to the other of the source and the drain of the third transistor 103.

Here, the first transistor 101, the second transistor 102, the third transistor 103, and the fourth transistor 104 are each an n-channel transistor.

Figure 3A:
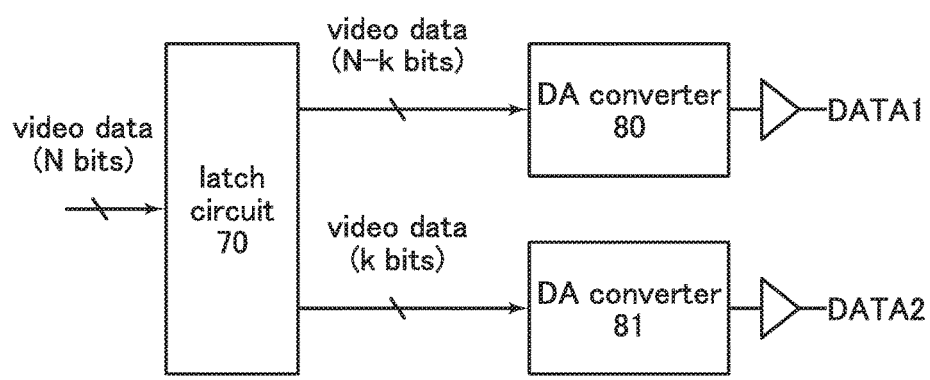
FIGS. 3A and 3B each illustrate a structure example of a semiconductor device.
Figure 3B:
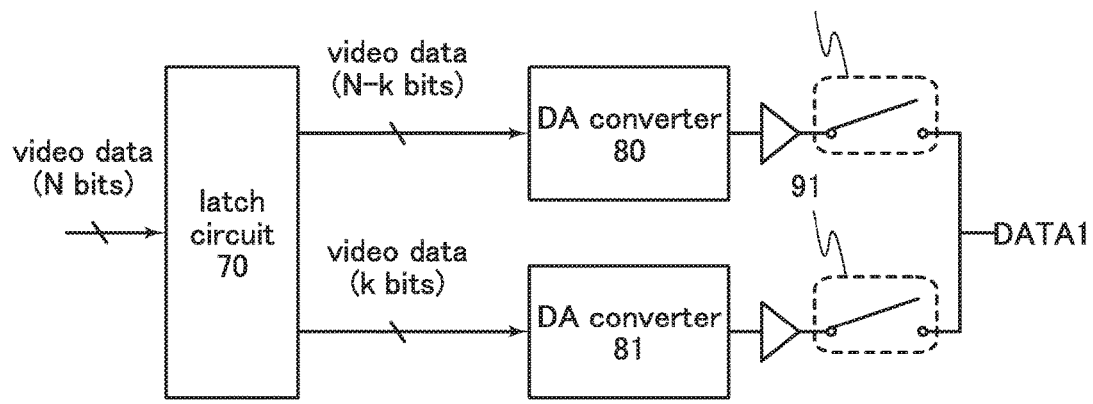

Next, the signals input to the wiring DATA1 and the wiring DATA2 will be described with reference to FIGS. 3A and 3B. Here, FIGS. 3A and 3B show examples of a configuration of the driver circuit 10; however, all components are not necessarily provided inside the driver circuit 10, and some of the components may be provided outside the driver circuit 10. Furthermore, the driver circuit 10 may include a component other than the components illustrated in FIGS. 3A and 3B.

FIG. 3A illustrates the driver circuit 10 which supplies signals to the wiring DATA1 and the wiring DATA2. The driver circuit 10 includes a latch circuit 70 to which an N-bit (N is an integer greater than or equal to 1) video signal is supplied, a D/A converter 80, and a D/A converter 81.

The N-bit video signal supplied to the latch circuit 70 is divided into an (N−k)-bit (k is an integer greater than or equal to 1 and less than or equal to (N−1)) video signal and a k-bit video signal, and they are output from output terminals. The (N−k)-bit video signal is supplied to the D/A converter 80. The k-bit video signal is supplied to the D/A converter 81. Here, k may or may not be N/2. In the case where k is not N/2, video signals with different numbers of bits are supplied to the D/A converter 80 and the D/A converter 81.

An output signal of the D/A converter 80 is supplied to the pixel 31 through the wiring DATA1. An output signal of the D/A converter 81 is supplied to the pixel 31 through the wiring DATA2. That is, a signal corresponding to the (N−k)-bit video signal is supplied through the wiring DATA1, and a signal corresponding to the k-bit video signal is supplied through the wiring DATA2.

For example, a signal through the wiring DATA1 illustrated in FIG. 3A is supplied to the first gate of the third transistor 103 through the first transistor 101 illustrated in FIG. 2A. Furthermore, a signal through the wiring DATA2 illustrated in FIG. 3A is supplied to the second gate of the third transistor 103 through the second transistor 102 illustrated in FIG. 2A.

FIG. 3B illustrates the driver circuit 10 which supplies signals to the wiring DATA1. The driver circuit 10 includes the latch circuit 70 to which the N-bit video signal is supplied, the D/A converter 80, the D/A converter 81, a switch 90, and a switch 91. Note that the description of the components which are the same as those in the driver circuit 10 illustrated in FIG. 3A is omitted.

In FIG. 3B, an output signal of the D/A converter 80 is supplied to the pixel 31 through the switch 90 and the wiring DATA1. An output signal of the D/A converter 81 is supplied to the pixel 31 through the switch 91 and the wiring DATA1. Here, when one of the switch 90 and the switch 91 is turned on, the other is turned off; thus, the wiring DATA1 is supplied with one of a signal corresponding to the (N−k)-bit video signal and a signal corresponding to the k-bit video signal. Therefore, one of the signal corresponding to the (N−k)-bit video signal and the signal corresponding to the k-bit video signal is supplied to the pixel 31.

Next, the characteristic of a transistor including a first gate and a second gate overlapping with each other with a semiconductor film therebetween will be described with reference to FIGS. 4A and 4B. The first gate is also referred to as a front gate, and the second gate is also referred to as a back gate.

Figure 4A:
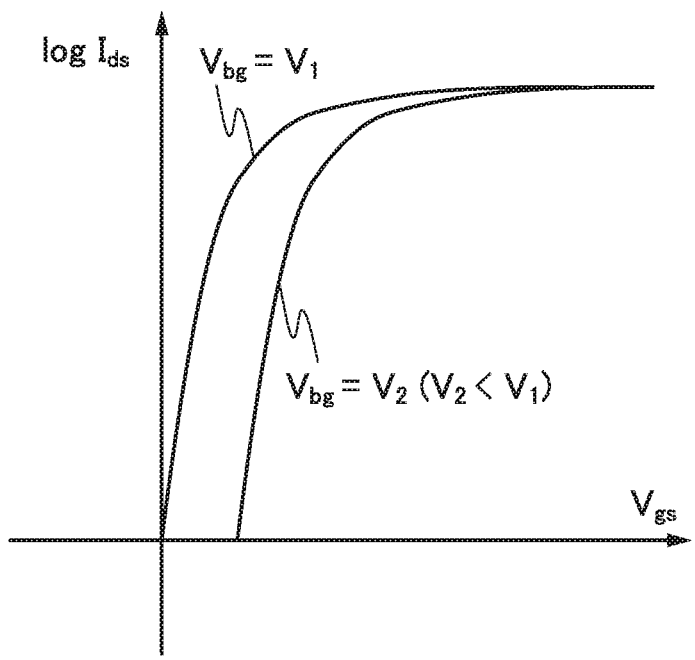
FIGS. 4A and 4B are conceptual graphs showing characteristics of a transistor.

FIG. 4A shows source-drain current $I_{ds}$ characteristics with respect to a voltage $V_{gs}$ between the first gate and a source of the transistor. Here, the vertical axis represents the logarithm $\log(I_{ds})$ of $I_{ds}$, and the horizontal axis represents $V_{gs}$. FIG. 4A shows $\log(I_{ds})$-$V_{gs}$ characteristics in both the case where a voltage $V_{bg}$ between the second gate and the source of the transistor is $V_1$ and the case where $V_{bg}$ is $V_2$. Note that $V_2$ is lower than $V_1$.

Figure 4B:
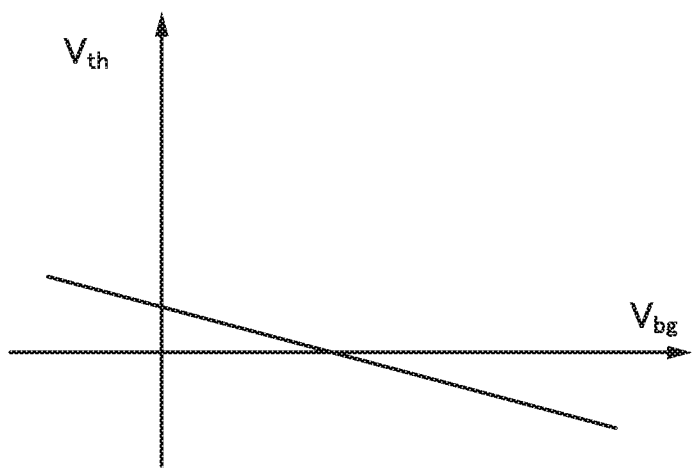

FIG. 4B shows the dependence of a threshold voltage $V_{th}$ of the transistor (voltage between the first gate and the source at which the source-drain current of the transistor is effectively 0) on the voltage $V_{bg}$ between the second gate and the source. As can be seen from FIG. 4B, $V_{th}$ monotonously decreases with an increase in $V_{bg}$.

As shown in FIG. 4A, with a decrease in $V_{bg}$, a curve showing $\log(I_{ds})$-$V_{gs}$ characteristics shifts in the positive direction of the horizontal axis $V_{gs}$. That is, the source-drain current of the transistor is controlled by the voltage $V_{gs}$ between the first gate and the source and the voltage $V_{bg}$ between the second gate and the source.

In this embodiment, a signal through the wiring DATA1 is supplied to the first gate of the third transistor 103; thus, the source-drain current of the third transistor 103 is controlled, and the display element 107 is controlled. Therefore, the gray level value of the display element 107 is controlled in response to the signal corresponding to the (N−k)-bit video signal supplied to the first gate of the third transistor 103. Furthermore, a signal through the wiring DATA2 is supplied to the second gate of the third transistor 103; thus, the source-drain current of the third transistor 103 is controlled, and the display element 107 is controlled. Therefore, the gray level value of the display element 107 is controlled in response to the signal corresponding to the k-bit video signal supplied to the second gate of the third transistor 103.

In the above manner, the gray level value of the display element 107 is controlled by both the first gate and the second gate of the third transistor 103.

For example, the display element 107 is controlled by the first gate of the third transistor 103 so as to have one of $2^{N-k}$ gray levels, and controlled by the second gate of the third transistor 103 so as to have one of $2^k$ gray levels. Thus, the display element 107 can perform display with $2^N$ gray levels by a combination of $2^{N-k}$ gray levels and $2^k$ gray levels.

Next, the D/A converter 80 and the D/A converter 81 illustrated in FIGS. 3A and 3B will be described with reference to FIG. 5B.

The D/A converter 80 supplied with the (N−k)-bit video signal includes $2^{N-k}$ wirings (gray level power supply lines) to supply the (N−k)-bit video signal to the wiring DATA1. Each of the $2^{N-k}$ wirings is electrically connected to the wiring DATA1 through a switch.

The D/A converter 81 supplied with the k-bit video signal includes $2^k$ wirings (gray level power supply lines) to supply the k-bit video signal to the wiring DATA2. Each of the $2^k$ wirings is electrically connected to the wiring DATA2 through a switch.

In the example shown here, the D/A converter 80 includes the $2^{N-k}$ wirings (gray level power supply lines) and the D/A converter 81 includes the $2^k$ wirings; however, the number of the wirings is not limited to the above. For example, the D/A converter 80 or the D/A converter 81 may include, for example, a wiring functioning as a dummy wiring, and the number of the wirings included in the D/A converter 80 and the number of the wirings included in the D/A converter 81 may be larger than $2^{N-k}$ and $2^k$ respectively.

Figure 5A:
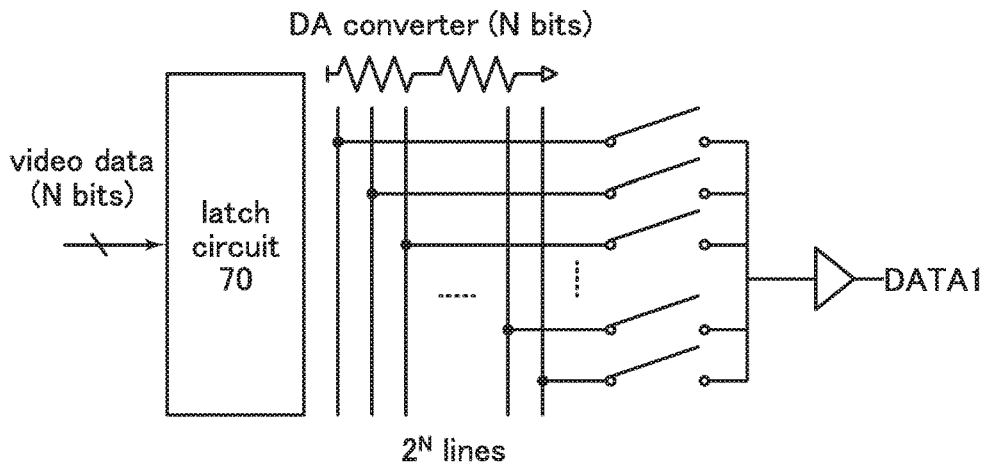
FIGS. 5A and 5B each illustrate a structure example of a semiconductor device.
Figure 5B:
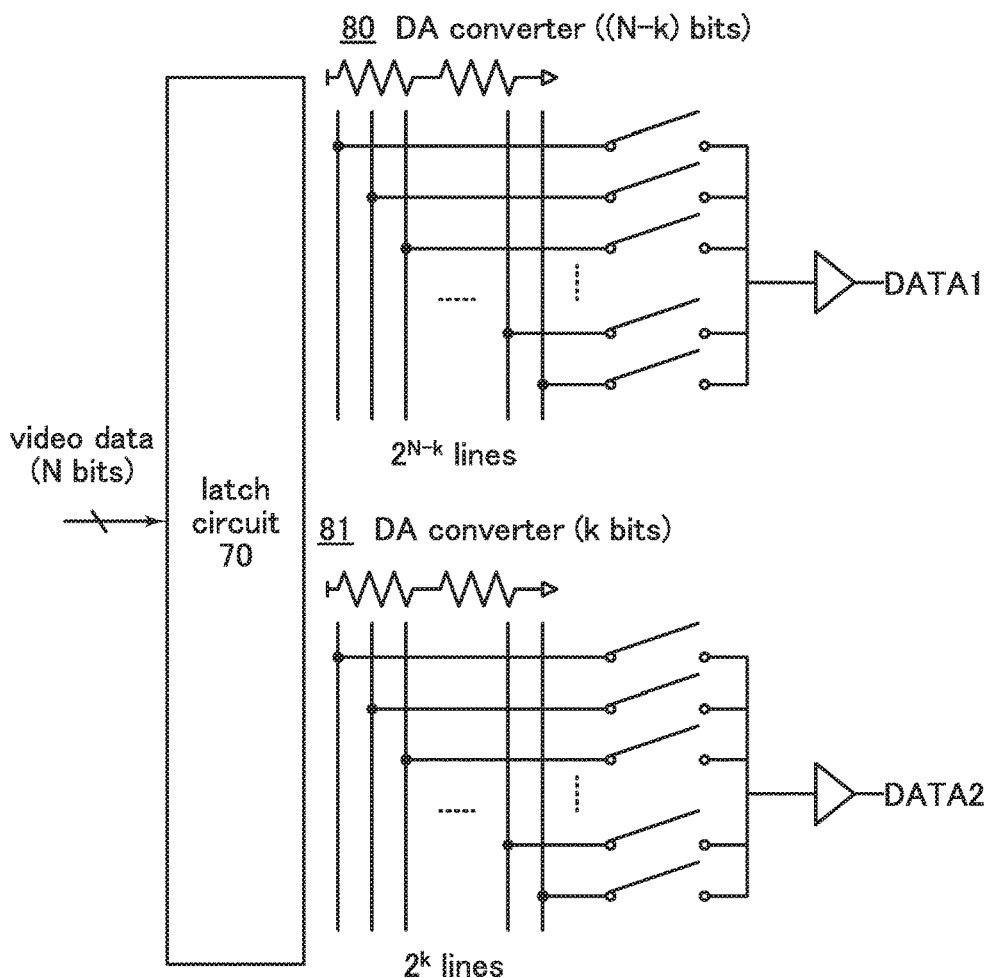

The total number of the gray level power supply lines needed for the D/A converter 80 and the D/A converter 81 illustrated in FIG. 5B is $2^{N-k}+2^k$. In the case where a signal corresponding to the N-bit video signal is supplied to only one gate of the transistor 103, the total number of the gray level power supply lines needed for the D/A converter is $2^N$ (see FIG. 5A).

In this embodiment, the total number of the gray level power supply lines included in the D/A converter 80 and the D/A converter 81 can be smaller than $2^N$. In other words, the number of gray level power supply lines needed for a D/A converter in a driver circuit can be smaller than $2^N$.

With the use of a semiconductor device of this embodiment, a semiconductor device whose gray level can be $2^N$ even in the case where the number of gray level power supply lines is smaller than $2^N$ can be provided as described above. A D/A converter in which the number of gray level power supply lines is smaller than $2^N$ while the gray level of a semiconductor device is $2^N$ can be provided. A semiconductor device whose size is small because the number of gray level power supply lines is smaller than $2^N$ can be provided. A D/A converter whose size is small because the number of gray level power supply lines is smaller than $2^N$ can be provided.

<Control of Gray Level Value of Display Element>

Here, the control of the gray level value of the display element 107 by the third transistor 103 illustrated in FIG. 2A is described. As described above, the gray level value of the display element 107 is controlled by the first gate and the second gate of the third transistor 103.

In the case where an active layer of the third transistor 103 is much thinner than a gate insulating film thereof, specifically in the case where the thickness of the active layer of the third transistor 103 is less than or equal to one-tenth of the thickness of the gate insulating film thereof, the threshold voltage $V_{th}$ of the third transistor 103 can be expressed by the following formula.

$$Vth = Vth0 - (Cb/Cf)Vbg$$

Here, $V_{bg}$ represents the voltage between the second gate and the source, $V_{th0}$ represents the threshold voltage of the third transistor at $V_{bg}=0$ V, $C_b$ represents the capacitance per unit area on the second gate side, and $C_f$ represents the capacitance per unit area on the first gate side.

According to the above formula, the control of $V_{th}$ by the second gate depends on the ratio of $C_b$ to $C_f$. For example, in the case where $C_b$ is one-tenth of $C_f$, in order to change $V_{th}$ accordingly, the voltage between the second gate and the source should be one order of magnitude higher than the voltage between the first gate and the source. Therefore, the number of bits of the video signal supplied to the D/A converter 80 and the number of bits of the video signal supplied to the D/A converter 81 may be set according to the ratio of $C_b$ to $C_f$ as appropriate.

From the above, in a semiconductor device of this embodiment, the gray level value of a display element is roughly controlled by one of a first gate and a second gate of a transistor, and is finely controlled by the other thereof; thus, the gray level value of the display element can be controlled more accurately. With the use of a semiconductor device of this embodiment, a high-quality image can be obtained.

Driving of Semiconductor Device

Figure 2B:
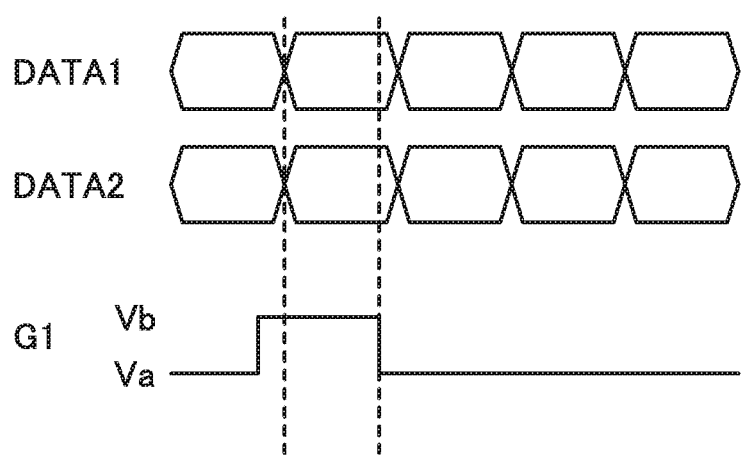

Next, a method for driving the semiconductor device illustrated in FIG. 2A will be described with reference to FIG. 2B. DATA1 and DATA2 illustrated in FIG. 2B are supplied with signals from the circuit illustrated in FIG. 3A.

The wiring G1 is supplied with a first potential $V_a$ and a second potential $V_b$, for example. Here, $V_a$ represents a potential (low potential) at which the first transistor 101, the second transistor 102, and the fourth transistor 104 are turned off. In contrast, $V_b$ represents a potential (high potential) at which the first transistor 101, the second transistor 102, and the fourth transistor 104 are turned on. In the case where the first transistor 101, the second transistor 102, and the fourth transistor 104 are n-channel transistors, $V_a$ is lower than $V_b$.

In an initial state, $V_a$ is supplied to the wiring G1. At this time, the first transistor 101, the second transistor 102, and the fourth transistor 104 are off.

Next, $V_b$ is supplied to the wiring G1. At this time, the first transistor 101, the second transistor 102, and the fourth transistor 104 are turned on. Since the first transistor 101 is turned on, a signal supplied to the wiring DATA1 is supplied to the first gate of the third transistor 103. Since the second transistor 102 is turned on, a signal supplied to the wiring DATA2 is supplied to the second gate of the third transistor 103. Since the fourth transistor 104 is turned on, a signal supplied to the wiring V0 is supplied to one of the source and the drain of the third transistor 103. The first capacitor 105 holds the signal supplied to the wiring DATA1. The second capacitor 106 holds the signal supplied to the wiring DATA2.

Then, $V_a$ is supplied to the wiring G1, so that the first transistor 101, the second transistor 102, and the fourth transistor 104 are turned off.

Through the above process, the source-drain current of the third transistor 103 is controlled by the signal supplied to the first gate and the signal supplied to the second gate, and the gray level value of the display element 107 is controlled.

<Structure Example 2>

Figure 6A:
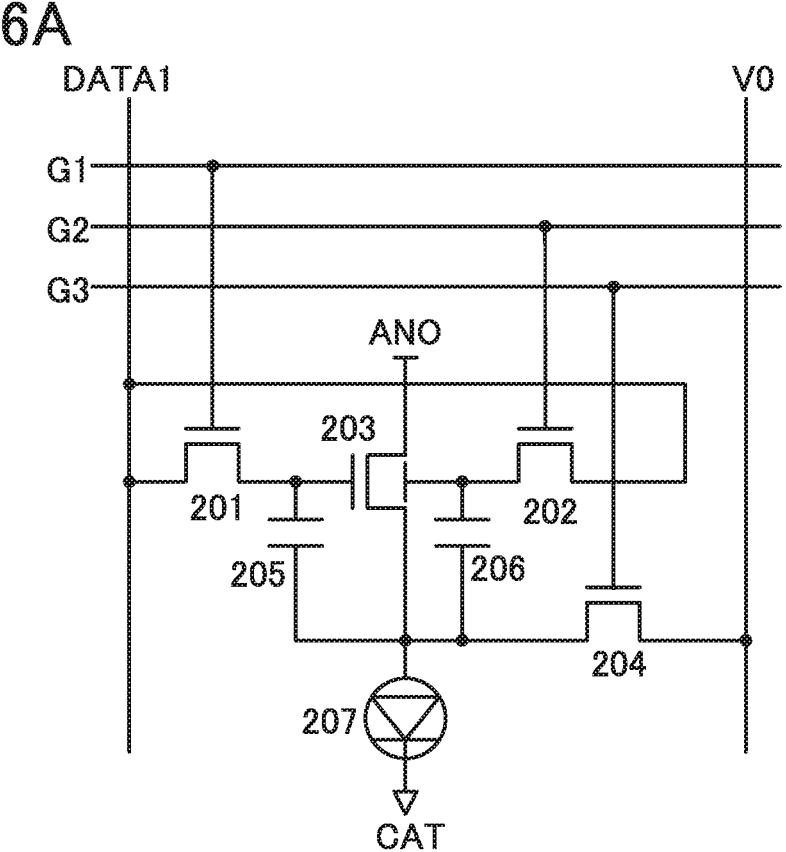
FIGS. 6A and 6B are a diagram illustrating a circuit example of a pixel and a timing chart.

FIG. 6A shows a circuit example of a pixel, which is different from Structure Example 1 illustrated in FIG. 2A.

The pixel 31 illustrated in FIG. 6A includes a first transistor 201, a second transistor 202, a third transistor 203, a fourth transistor 204, a first capacitor 205, a second capacitor 206, and a display element 207. The third transistor 203 includes a first gate and a second gate overlapping with each other with a semiconductor film therebetween.

A gate of the first transistor 201 is electrically connected to a wiring G1, one of a source and a drain of the first transistor 201 is electrically connected to a wiring DATA1, and the other of the source and the drain of the first transistor 201 is electrically connected to the first gate of the third transistor 203. The first gate of the third transistor 203 is connected to the wiring DATA1 through the first transistor 201, and is supplied with a signal input to the wiring DATA1.

A gate of the second transistor 202 is electrically connected to a wiring G2, one of a source and a drain of the second transistor 202 is electrically connected to the wiring DATA1, and the other of the source and the drain of the second transistor 202 is electrically connected to the second gate of the third transistor 203. The second gate of the third transistor 203 is connected to the wiring DATA1 through the second transistor 202, and is supplied with a signal input to the wiring DATA1.

One of a source and a drain of the third transistor 203 is connected to a wiring ANO. The wiring ANO may be a power supply line through which a fixed potential is supplied. The other of the source and the drain of the third transistor 203 is electrically connected to the display element 207.

A current supplied to the display element 207 is equivalent to a source-drain current of the third transistor 203, which flows in response to signals supplied to the first gate and the second gate of the third transistor 203. In other words, the gray level value of a display image signal of the display element 207 is controlled by the signal input to the wiring DATA1 and then supplied to the first gate and the second gate of the third transistor 203.

A gate of the fourth transistor 204 is electrically connected to a wiring G3, one of a source and a drain of the fourth transistor 204 is electrically connected to a wiring V0, and the other of the source and the drain of the fourth transistor 204 is electrically connected to the other of the source and the drain of the third transistor 203. The wiring V0 may be a power supply line through which a fixed potential is supplied. As the fixed potential, for example, a ground potential can be employed.

One of electrodes of the first capacitor 205 is electrically connected to the first gate of the third transistor 203, and the other electrode of the first capacitor 205 is electrically connected to the other of the source and the drain of the third transistor 203.

One of electrodes of the second capacitor 206 is electrically connected to the second gate of the third transistor 203, and the other electrode of the second capacitor 206 is electrically connected to the other of the source and the drain of the third transistor 203.

Here, the first transistor 201, the second transistor 202, the third transistor 203, and the fourth transistor 204 are each an n-channel transistor.

As a driver circuit for supplying the signal input to the wiring DATA1, the circuit illustrated in FIG. 3B can be used. Therefore, as the wiring DATA1, a wiring through which a signal corresponding to an (N−k)-bit video signal and a signal corresponding to a k-bit signal are supplied to the pixel 31 can be used.

Next, a method for driving the semiconductor device illustrated in FIG. 6A will be described with reference to FIG. 6B.

The wirings G1, G2, and G3 are each supplied with a first potential $V_a$ and a second potential $V_b$, for example. Here, $V_a$ represents a potential (low potential) at which the first transistor 201, the second transistor 202, and the fourth transistor 204 are turned off. In contrast, $V_b$ represents a potential (high potential) at which the first transistor 201, the second transistor 202, and the fourth transistor 204 are turned on. In the case where the first transistor 201, the second transistor 202, and the fourth transistor 204 are n-channel transistors, $V_a$ is lower than $V_b$. Note that the potential supplied to the wiring G1, the potential supplied to the wiring G2, and the potential supplied to the wiring G3 may be the same or different from each other so long as they are the ones at which the first transistor 201, the second transistor 202, and the fourth transistor 204 are turned off or on, respectively.

In an initial state, $V_a$ is supplied to each of the wirings G1, G2, and G3. At this time, the first transistor 201, the second transistor 202, and the fourth transistor 204 are off.

Next, $V_a$ is supplied to the wiring G1, and $V_b$ is supplied to each of the wirings G2 and G3. At this time, the first transistor 201 is kept off, and the second transistor 202 and the fourth transistor 204 are turned on. Since the second transistor 202 is turned on, a signal supplied to the wiring DATA1 is supplied to the second gate of the third transistor 203. Since the fourth transistor 204 is turned on, a signal supplied to the wiring V0 is supplied to one of the source and the drain of the third transistor 203. The second capacitor 206 holds the signal supplied to the wiring DATA1.

Next, $V_b$ is supplied to each of the wirings G1 and G3, and $V_a$ is supplied to the wiring G2. At this time, the first transistor 201 is turned on, the fourth transistor 204 is kept on, and the second transistor 202 is turned off. Since the first transistor 201 is turned on, a signal supplied to the wiring DATA1 is supplied to the first gate of the third transistor 203. Since the fourth transistor 204 is turned on, a signal supplied to the wiring V0 is supplied to one of the source and the drain of the third transistor 203. The first capacitor 205 holds the signal supplied to the wiring DATA1.

Figure 6B:
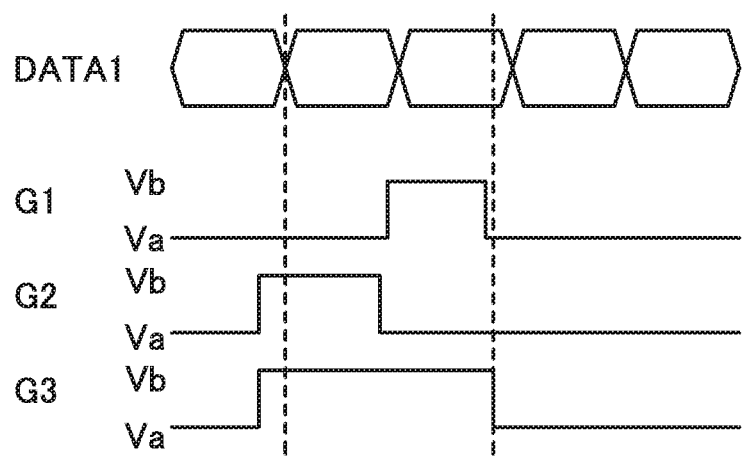

In the example of FIG. 6B, $V_b$ is supplied to G1 after being supplied to G2; however, $V_b$ may be supplied to G2 after being supplied to G1.

In Structure Example 2, the signal corresponding to the (N−k)-bit video signal and the signal corresponding to the k-bit signal are supplied to the wiring DATA1 in different periods. For example, a structure may be employed in which the signal corresponding to the (N−k)-bit video signal is supplied to the wiring DATA1 when $V_b$ is supplied to G1, and the signal corresponding to the k-bit signal is supplied to the wiring DATA1 when $V_b$ is supplied to G2.

Then, $V_a$ is supplied to each of the wirings G1, G2, and G3, so that the first transistor 201 and the fourth transistor 204 are turned off, and the second transistor 202 is kept off.

Through the above process, the source-drain current of the third transistor 203 is controlled by the signal supplied to the first gate and the signal supplied to the second gate, and the gray level value of the display element 207 is controlled.

<Structure Example 3>

Figure 7A:
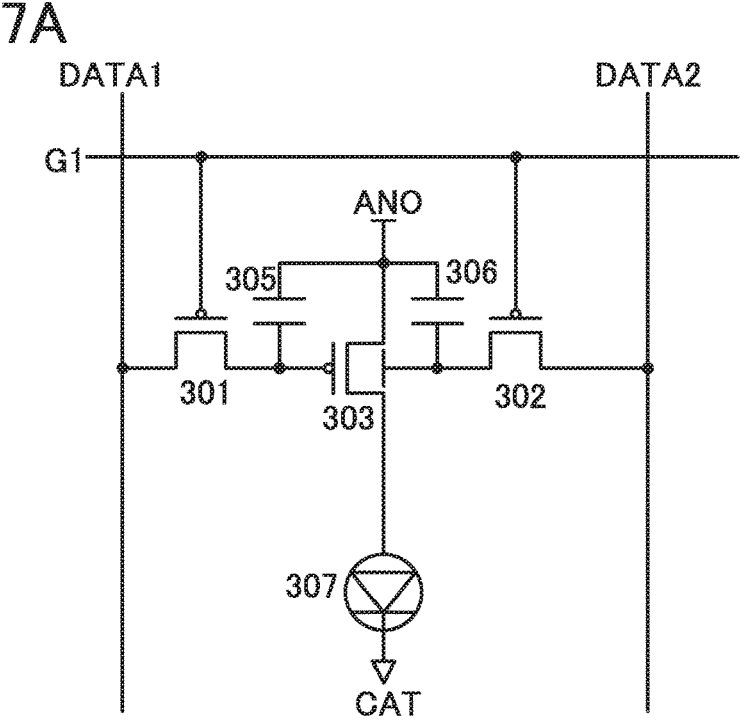
FIGS. 7A and 7B each illustrate a circuit example of a pixel.

FIG. 7A shows a circuit example of a pixel, which is different from Structure Example 1 illustrated in FIG. 2A and Structure Example 2 illustrated in FIG. 6A.

The pixel 31 illustrated in FIG. 7A includes a first transistor 301, a second transistor 302, a third transistor 303, a first capacitor 305, a second capacitor 306, and a display element 307. The third transistor 303 includes a first gate and a second gate overlapping with each other with a semiconductor film therebetween.

A gate of the first transistor 301 is electrically connected to a wiring G1, one of a source and a drain of the first transistor 301 is electrically connected to a wiring DATA1, and the other of the source and the drain of the first transistor 301 is electrically connected to the first gate of the third transistor 303. The first gate of the third transistor 303 is connected to the wiring DATA1 through the first transistor 301, and is supplied with a signal input to the wiring DATA1.

A gate of the second transistor 302 is electrically connected to the wiring G1, one of a source and a drain of the second transistor 302 is electrically connected to a wiring DATA2, and the other of the source and the drain of the second transistor 302 is electrically connected to the second gate of the third transistor 303. The second gate of the third transistor 303 is connected to the wiring DATA2 through the second transistor 302, and is supplied with a signal input to the wiring DATA2.

One of a source and a drain of the third transistor 303 is connected to a wiring ANO. The wiring ANO may be a power supply line through which a fixed potential is supplied. The other of the source and the drain of the third transistor 303 is electrically connected to the display element 307.

A current supplied to the display element 307 is equivalent to a source-drain current of the third transistor 303, which flows in response to signals supplied to the first gate and the second gate of the third transistor 303. In other words, the gray level value of a display image signal of the display element 307 is controlled by both the signal input to the wiring DATA1 and the signal input to the wiring DATA2.

One of electrodes of the first capacitor 305 is electrically connected to the first gate of the third transistor 303, and the other electrode of the first capacitor 305 is electrically connected to the one of the source and the drain of the third transistor 303.

One of electrodes of the second capacitor 306 is electrically connected to the second gate of the third transistor 303, and the other electrode of the second capacitor 306 is electrically connected to the one of the source and the drain of the third transistor 303.

Here, the first transistor 301, the second transistor 302, and the third transistor 303 are each a p-channel transistor.

As a driver circuit for supplying the signal input to the wiring DATA1 and the signal input to the wiring DATA2, the circuit illustrated in FIG. 3A can be used. Therefore, a wiring through which a signal corresponding to an (N−k)-bit video signal is supplied to the pixel 31 can be used as the wiring DATA1, and a wiring through which a signal corresponding to a k-bit signal is supplied to the pixel 31 can be used as the wiring DATA2.

<Structure Example 4>

Figure 7B:
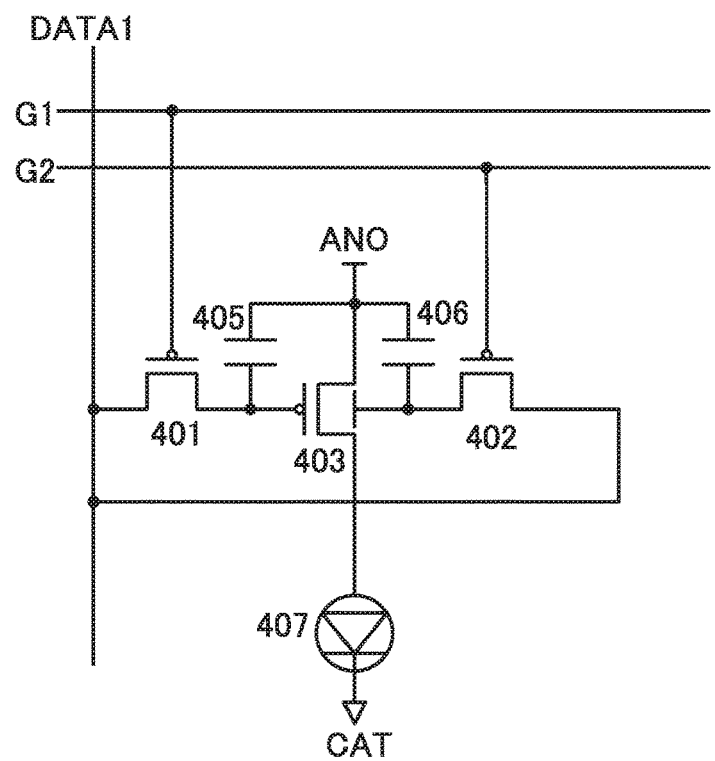

FIG. 7B shows a circuit example of a pixel, which is different from Structure Example 1 illustrated in FIG. 2A, Structure Example 2 illustrated in FIG. 6A, and Structure Example 3 illustrated in FIG. 7A.

The pixel 31 illustrated in FIG. 7B includes a first transistor 401, a second transistor 402, a third transistor 403, a first capacitor 405, a second capacitor 406, and a display element 407. The third transistor 403 includes a first gate and a second gate overlapping with each other with a semiconductor film therebetween.

A gate of the first transistor 401 is electrically connected to a wiring G1, one of a source and a drain of the first transistor 401 is electrically connected to a wiring DATA1, and the other of the source and the drain of the first transistor 401 is electrically connected to the first gate of the third transistor 403. The first gate of the third transistor 403 is connected to the wiring DATA1 through the first transistor 401, and is supplied with a signal input to the wiring DATA1.

A gate of the second transistor 402 is electrically connected to a wiring G2, one of a source and a drain of the second transistor 402 is electrically connected to the wiring DATA1, and the other of the source and the drain of the second transistor 402 is electrically connected to the second gate of the third transistor 403. The second gate of the third transistor 403 is connected to the wiring DATA1 through the second transistor 402, and is supplied with a signal input to the wiring DATA1.

One of a source and a drain of the third transistor 403 is connected to a wiring ANO. The wiring ANO may be a power supply line through which a fixed potential is supplied. The other of the source and the drain of the third transistor 403 is electrically connected to the display element 407.

A current supplied to the display element 407 is equivalent to a source-drain current of the third transistor 403, which flows in response to signals supplied to the first gate and the second gate of the third transistor 403. In other words, the gray level value of a display image signal of the display element 407 is controlled by the signal input to the wiring DATA1 and then supplied to the first gate and the second gate of the third transistor 403.

One of electrodes of the first capacitor 405 is electrically connected to the first gate of the third transistor 403, and the other electrode of the first capacitor 405 is electrically connected to the one of the source and the drain of the third transistor 403.

One of electrodes of the second capacitor 406 is electrically connected to the second gate of the third transistor 403, and the other electrode of the second capacitor 406 is electrically connected to the one of the source and the drain of the third transistor 403.

Here, the first transistor 401, the second transistor 402, and the third transistor 403 are each a p-channel transistor.

As a driver circuit for supplying the signal input to the wiring DATA1, the circuit illustrated in FIG. 3B can be used.

With the use of a semiconductor device of this embodiment, a semiconductor device whose gray level can be $2^N$ even in the case where the number of gray level power supply lines is smaller than $2^N$ can be provided. A D/A converter in which the number of gray level power supply lines is smaller than $2^N$ while the gray level of a semiconductor device is $2^N$ can be provided. A semiconductor device whose size is small because the number of gray level power supply lines is smaller than $2^N$ can be provided. A D/A converter whose size is small because the number of gray level power supply lines is smaller than $2^N$ can be provided.

In a semiconductor device of this embodiment, the gray level value of a display element can be controlled more accurately. With the use of the semiconductor device of this embodiment, a high-quality image (an image with high gray level) can be obtained.

The structures and the like described in this embodiment can be combined as appropriate with any of the structures and the like described in the other embodiments.

(Embodiment 2)

<Specific Structure Example of Display Device>

Figure 8:
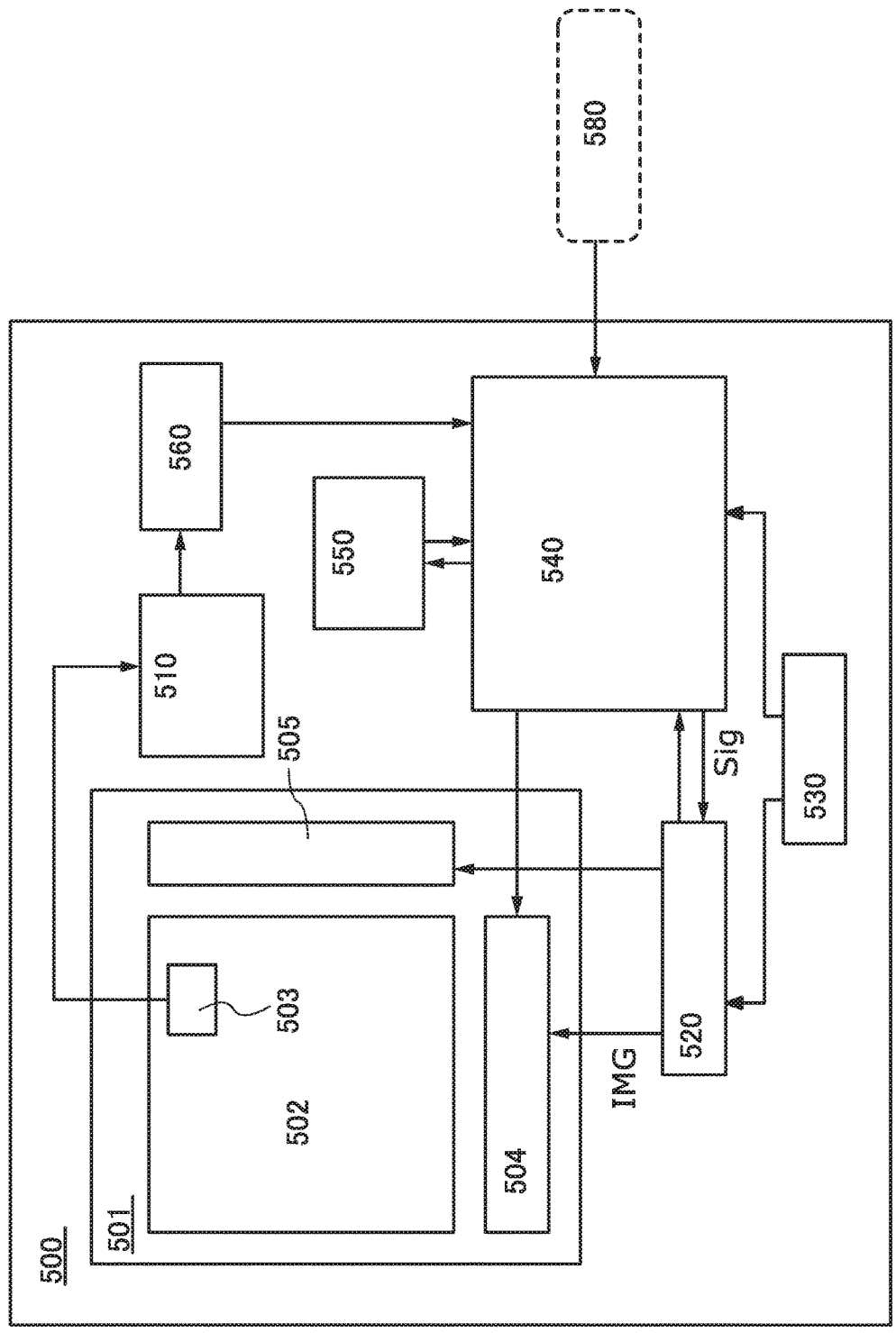
FIG. 8 illustrates a structure example of a display device.

An example of a structure of a display device will be described. FIG. 8 is a block diagram showing a structure of a display device 500. Although the block diagram shows circuit blocks classified according to their functions in independent blocks, it may be practically difficult to completely separate the circuit blocks according to their functions and, in some cases, one circuit block may be involved in a plurality of functions.

The display device 500 illustrated in FIG. 8 includes a panel 501 including a plurality of display pixels 503 in a pixel portion 502, a controller 520, a CPU 530, an image processing circuit 540, an image memory 550, a memory 560, and a monitor circuit 510. Furthermore, the panel 501 includes a column driver 504 and a row driver 505.

The CPU 530 has a function of decoding an instruction input from the outside or an instruction stored in a memory provided in the CPU 530 and executing the instruction by controlling the overall operations of various circuits included in the display device 500.

The monitor circuit 510 determines the current values of driving transistors included in the respective display pixels. The memory 560 has a function of storing the current values.

The image memory 550 has a function of storing image data 580 which is input to the display device 500. Note that although just one image memory 550 is provided in the display device 500 in FIG. 8, a plurality of image memories 550 may be provided in the display device 500. For example, in the case where the pixel portion 502 displays a full-color image with the use of three pieces of image data 580 corresponding to hues such as red, blue, and green, the image memory 550 corresponding to each of the pieces of image data 580 may be provided.

As the image memory 550, for example, a memory circuit such as a dynamic random access memory (DRAM) or a static random access memory (SRAM) can be used. Alternatively, a video RAM (VRAIVI) may be used as the image memory 550.

The image processing circuit 540 has functions of writing and reading the image data 580 to and from the image memory 550 in response to an instruction from the CPU 530 and generating an image signal IMG from the image data 580. In addition, the image processing circuit 540 has a function of reading the data stored in the memory 560 in response to an instruction from the CPU 530 and correcting the image signal IMG using the data.

The controller 520 has a function of processing the image signal IMG which is input to the controller 520, in accordance with the specification of the panel 501 and then supplying the image signal IMG to the panel 501.

The row driver 505 has a function of selecting the display pixels 503 included in the pixel portion 502 row by row. The column driver 504 has a function of supplying the image signal IMG supplied from the controller 520 to the display pixels 503 in a row selected by the row driver 505. In addition, one of the column driver 504 and the row driver 505 outputs an output signal to a code signal line Sig. The other of the column driver 504 and the row driver 505 has a function of measuring a current value of a column signal line CL or a function of transferring a signal of the column signal line CL to another circuit for measurement of the current value.

Note that the controller 520 has a function of supplying a variety of driving signals used for driving the column driver 504, the row driver 505, and the like, to the panel 501. The driving signal includes a start pulse signal, a clock signal, and a latch signal for controlling operation of the column driver 504, a start pulse signal and a clock signal for controlling operation of the row driver 505, and the like.

Note that the display device 500 may include an input device having a function of giving data or an instruction to the CPU 530 included in the display device 500. As the input device, a keyboard, a pointing device, a touch panel, a sensor, or the like can be used.

<Structure Examples of Elements

Next, specific structure examples of elements included in the display pixel 503 will be described. For a circuit diagram of the display pixel, refer to FIG. 2A, FIG. 6A, and FIGS. 7A and 7B.

For example, the potential of a pixel electrode of the display element 107 in FIG. 2A is controlled by the image signal IMG input to the display pixel 503. The luminance of the display element 107 depends on a potential difference between the pixel electrode and a common electrode. For example, in the case where an OLED (an organic light-emitting diode) is used as the display element 107, one of an anode and a cathode serves as the pixel electrode and the other thereof serves as the common electrode. FIG. 2A illustrates a configuration of the display pixel 503 in which the anode of the display element 107 is used as the pixel electrode and the cathode of the display element 107 is used as the common electrode.

In the transistors included in the display pixel 503, an oxide semiconductor or an amorphous, microcrystalline, polycrystalline, or single crystal semiconductor can be used. As a material of such a semiconductor, silicon, germanium, and the like can be given. When the transistor includes an oxide semiconductor in a channel formation region, the off-state current of the transistor can be extremely low. Furthermore, when the transistor having the above-described structure is used in the display pixel 503, leakage of electric charge accumulated in a node can be prevented effectively as compared with the case where a transistor including a normal semiconductor such as silicon or germanium is used.

Accordingly, for example, in the case where image signals IMG having the same image data are written to the pixel portion 502 for some consecutive frame periods as in the case of displaying a still image, display of an image can be maintained even when driving frequency is low, in other words, the number of operations of writing image signals IMG to the pixel portion 502 for a certain period is reduced. For example, a purified oxide semiconductor in which impurities serving as electron donors (donors), such as moisture or hydrogen, are reduced and oxygen vacancies are reduced is used for a semiconductor film of the transistor, whereby the interval between the operations of writing image signals IMG can be set to 10 seconds or longer, preferably 30 seconds or longer, or further preferably one minute or longer. As the interval between the operations of writing image signals IMG increases, power consumption can be further reduced.

In addition, since the potential of the image signal IMG can be held for a longer period, the quality of an image to be displayed can be prevented from being lowered even when a capacitor for holding the potential of the node is not provided in the display pixel 503.

The transistors in FIG. 2A are all n-channel transistors. When the transistors in the display pixel 503 have the same channel type, it is possible to omit some of steps for fabricating the transistors, for example, a step of adding an impurity element imparting one conductivity type to the semiconductor film. Note that in the display device, not all the transistors in the display pixel 503 are necessarily n-channel transistors.

<Structure Example 1 of Transistor

FIGS. 9A and 9B and FIGS. 14A and 14B illustrate examples of transistors included in the display device.

Figure 9A:
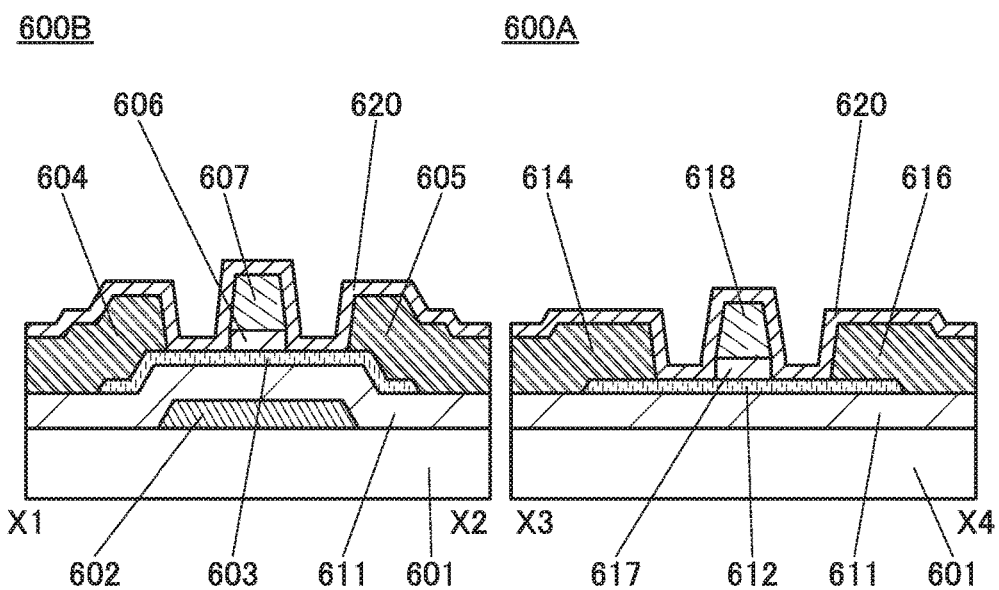
FIGS. 9A and 9B are cross-sectional views of transistors.
Figure 9B:
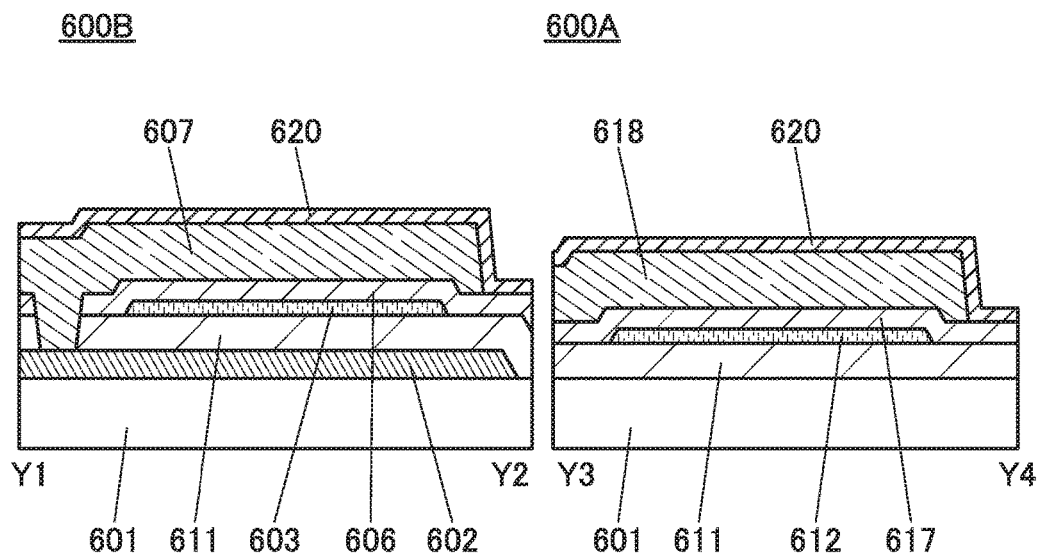
Figure 14A:
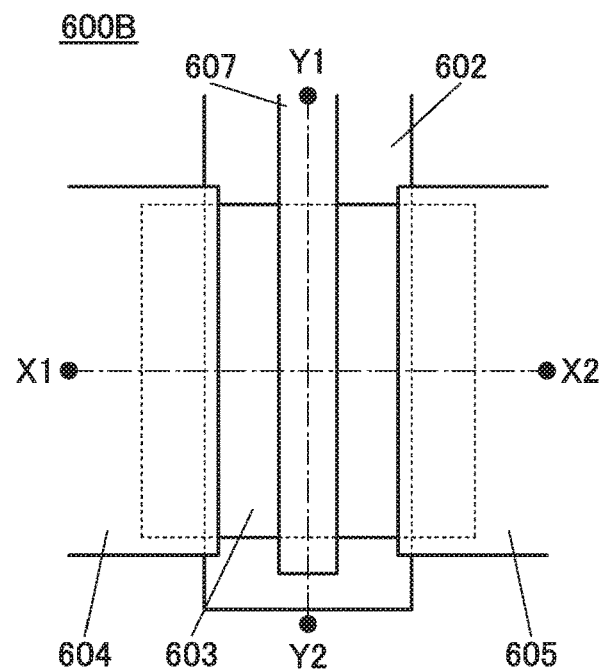
FIGS. 14A and 14B are top views of transistors.
Figure 14B:
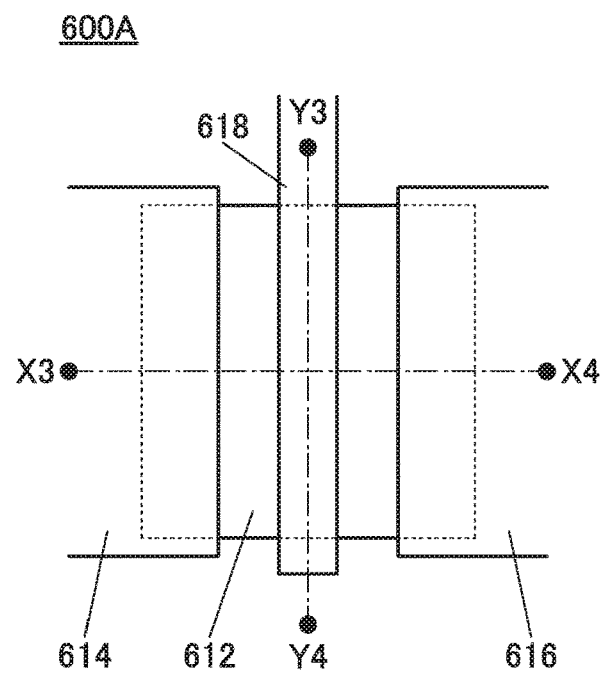

FIGS. 14A and 14B are top views of a transistor 600B provided in the driver circuit and a transistor 600A provided in the pixel portion 502, respectively. FIGS. 9A and 9B are cross-sectional views of the transistor 600B and the transistor 600A. FIG. 14A is the top view of the transistor 600B and FIG. 14B is the top view of the transistor 600A. FIG. 9A shows a cross section along the dashed-dotted line X1-X2 in FIG. 14A and a cross section along the dashed-dotted line X3-X4 in FIG. 14B. FIG. 9B shows a cross section along the dashed-dotted line Y1-Y2 in FIG. 14A and a cross section along the dashed-dotted line Y3-Y4 in FIG. 14B. FIG. 9A shows a cross-sectional view of the transistors 600A and 600B in a channel length direction, and FIG. 9B shows a cross-sectional view of the transistors 600A and 600B in a channel width direction.

In a manner similar to that of the transistors 600A and 600B, some components are not illustrated in some cases in top views of transistors described below. Furthermore, the direction of the dashed-dotted line X1-X2 and the direction of the dashed-dotted line X3-X4 may be called a channel length direction, and the direction of the dashed-dotted line Y1-Y2 and the direction of the dashed-dotted line Y3-Y4 may be called a channel width direction.

The transistor 600A illustrated in FIGS. 9A and 9B includes an oxide semiconductor film 612 over an insulating film 611 over a substrate 601; a conductive film 614, a conductive film 616, and an insulating film 617 that are in contact with the oxide semiconductor film 612; and a conductive film 618 that overlaps with the oxide semiconductor film 612 with the insulating film 617 placed therebetween. An insulating film 620 is provided over the transistor 600A. The transistor 600A can be used as the first transistor 101, the second transistor 102, and the fourth transistor 104 in FIG. 2A, for example.

The transistor 600B illustrated in FIGS. 9A and 9B includes an oxide semiconductor film 603 over the insulating film 611 over the substrate 601; a conductive film 604, a conductive film 605, and an insulating film 606 that are in contact with the oxide semiconductor film 603; and a conductive film 607 that overlaps with the oxide semiconductor film 603 with the insulating film 606 placed therebetween. The insulating film 620 is provided over the transistor 600B.

The transistor 600B includes a conductive film 602 that overlaps with the oxide semiconductor film 603 with the insulating film 611 placed therebetween. That is, the conductive film 602 serves as a gate (gate electrode or gate terminal). Furthermore, the transistor 600B is a transistor having a dual-gate structure. The other components of the transistor 600B are similar to those of the transistor 600A and have functions similar to those in the transistor 600A.

When the conductive film 602 and the conductive film 607 are supplied with different potentials, the threshold voltage of the transistor 600B can be controlled. For example, the transistor 600B can be used as the third transistor 103 in FIG. 2A. Alternatively, when the conductive film 602 and the conductive film 607 are supplied with the same potential, an increase in the on-state current, a reduction in variation in initial characteristics, a reduction in deterioration in a negative gate bias temperature (−GBT) stress test, and suppression in changes in the rising voltage of on-state current at different drain-source voltages are possible. For example, the transistor 600B can be used as transistors included in the driver circuit 10 or the driver circuit 20 in FIG. 1.

In addition, the transistor in the column driver 504/the row driver 505 and the transistor in the pixel portion 502 may have different channel lengths.

Typically, the channel length of the transistor 600B included in the column driver 504/the row driver 505 can be less than 2.5 μm, or greater than or equal to 1.45 μm and less than or equal to 2.2 μm. The channel length of the transistor 600A included in the pixel portion 502 can be greater than or equal to 2.5 μm, or greater than or equal to 2.5 μm and less than or equal to 20 μm.

When the channel length of the transistor 600B included in the column driver 504/the row driver 505 is less than 2.5 μm, preferably greater than or equal to 1.45 μm and less than or equal to 2.2 μm, the on-state current can be increased as compared with the transistor 600A included in the pixel portion 502. Consequently, the column driver 504/the row driver 505 can operate at high speed.

In the oxide semiconductor film 612, an element that forms an oxygen vacancy is included in a region that overlaps with neither the conductive film 614, the conductive film 616, nor the conductive film 618. In the oxide semiconductor film 603, an element that forms an oxygen vacancy is included in a region that overlaps with neither the conductive film 604, the conductive film 605, nor the conductive film 607. An element that forms an oxygen vacancy is described below as an impurity element. Typical examples of the impurity element are hydrogen, a rare gas element, and the like. Typical examples of the rare gas element are helium, neon, argon, krypton, and xenon. Furthermore, boron, carbon, nitrogen, fluorine, aluminum, silicon, phosphorus, chlorine, or the like may be contained in the oxide semiconductor film 612 and the oxide semiconductor film 603 as an impurity element.

The insulating film 620 is a film containing hydrogen and is typically a nitride insulating film. The insulating film 620 is in contact with the oxide semiconductor film 612 and the oxide semiconductor film 603, whereby hydrogen contained in the insulating film 620 is diffused to the oxide semiconductor film 612 and the oxide semiconductor film 603. Consequently, much hydrogen is contained in the regions of the oxide semiconductor film 612 and the oxide semiconductor film 603 in contact with the insulating film 620.

When a rare gas element is added as an impurity element to the oxide semiconductor film, a bond between a metal element and oxygen in the oxide semiconductor film is cut, whereby an oxygen vacancy is formed. By interaction between hydrogen and the oxygen vacancy included in the oxide semiconductor film, the conductivity of the oxide semiconductor film is increased. Specifically, hydrogen enters the oxygen vacancies in the oxide semiconductor film, whereby an electron serving as a carrier is produced. As a result, the conductivity is increased.

Figure 10A:
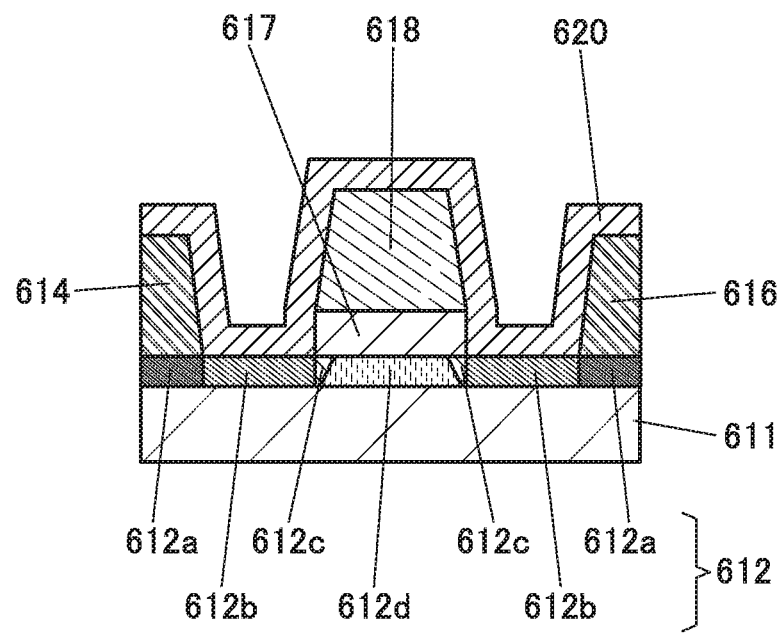
FIGS. 10A and 10B are each a cross-sectional view of a transistor.
Figure 10B:
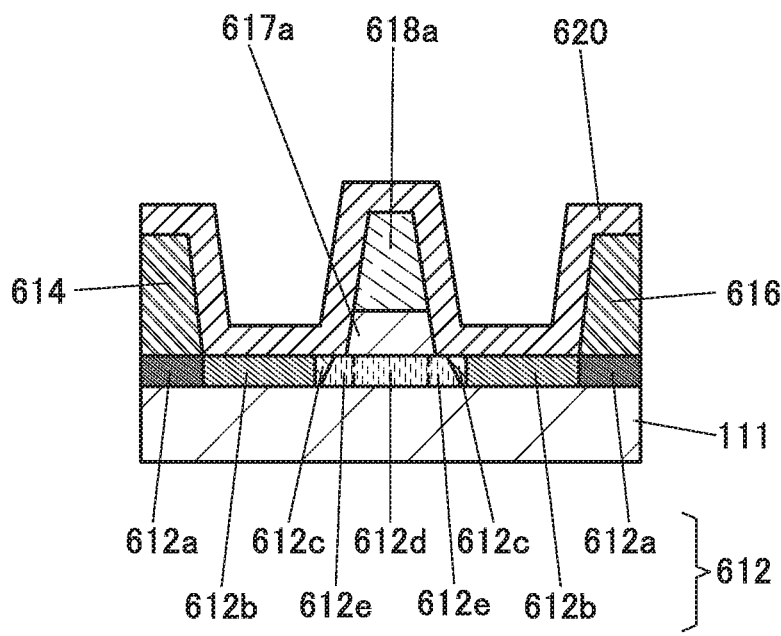

Here, FIGS. 10A and 10B are partial enlarged views of the oxide semiconductor film 612. Note that as typical examples, description is made with reference to the partial enlarged views of the oxide semiconductor film 612 included in the transistor 600A. As shown in FIGS. 10A and 10B, the oxide semiconductor film 612 includes a region 612a in contact with the conductive film 614 or the conductive film 616, a region 612b in contact with the insulating film 620, and a region 612d in contact with the insulating film 617. Note that in the case where the conductive film 618 has a tapered side surface, the oxide semiconductor film 612 may include regions 612c overlapping with a tapered portion of the conductive film 618.

The regions 612a serve as a source region and a drain region. In the case where the conductive films 614 and 616 are formed using a conductive material which is easily bonded to oxygen, such as tungsten, titanium, aluminum, copper, molybdenum, chromium, tantalum, or an alloy of any of these, oxygen contained in the oxide semiconductor film is bonded to the conductive material contained in the conductive films 614 and 616, and oxygen vacancies are formed in the oxide semiconductor film. Further, in some cases, part of constituent elements of the conductive material that forms the conductive films 614 and 616 is mixed into the oxide semiconductor film. As a result, the regions 612a in contact with the conductive film 614 and the conductive film 616 have higher conductivity and serve as a source region and a drain region.

The regions 612b function as low-resistance regions. The regions 612b contain at least a rare gas element and hydrogen as impurity elements. Note that in the case where the side surface of the conductive film 618 has a tapered shape, the impurity element is added to the regions 612c through the tapered portion of the conductive film 618. Therefore, the regions 612c contain the impurity element although the concentration of the rare gas element, which is an example of the impurity element, in the regions 612c is lower than that in the regions 612b. With the regions 612c, source-drain breakdown voltage of the transistor can be increased.

In the case where the oxide semiconductor film 612 is formed by a sputtering method, the regions 612a to 612d each contain a rare gas element. In addition, the rare gas element concentration in each of the regions 612b and 612c is higher than that in each of the regions 612a and 612d. This is because a rare gas element is used as a sputtering gas to form the oxide semiconductor film 612 by sputtering and is therefore included in the oxide semiconductor film 612, and because a rare gas element is intentionally added to the regions 612b and 612c to form an oxygen vacancy. Note that a rare gas element different from that added to the regions 612a and 612d may be added to the regions 612b and 612c.

Since the region 612b is in contact with the insulating film 620, the hydrogen concentration in the region 612b is higher than those in the region 612a and the region 612d. In the case where hydrogen is diffused from the region 612b to the region 612c, the hydrogen concentration in the region 612c is higher than those in the region 612a and the region 612d. Note that the hydrogen concentration in the region 612b is higher than that in the region 612c.

In the regions 612b and 612c, the concentrations of hydrogen measured by secondary ion mass spectrometry (SIMS) can be greater than or equal to $8 \times 10^{19}$ atoms/cm$^3$, greater than or equal to $1 \times 10^{20}$ atoms/cm$^3$, or greater than or equal to $5 \times 10^{20}$ atoms/cm$^3$. Note that in the regions 612a and 612d, the concentrations of hydrogen measured by SIMS can be less than or equal to $5 \times 10^{19}$ atoms/cm$^3$, less than or equal to $1 \times 10^{19}$ atoms/cm$^3$, less than or equal to $5 \times 10^{18}$ atoms/cm$^3$, less than or equal to $1 \times 10^{18}$ atoms/cm$^3$, less than or equal to $5 \times 10^{17}$ atoms/cm$^3$, or less than or equal to $1 \times 10^{16}$ atoms/cm$^3$.

In the case where boron, carbon, nitrogen, fluorine, aluminum, silicon, phosphorus, or chlorine is added to the oxide semiconductor film 612 as an impurity element, only the regions 612b and 612c contain the impurity element. Therefore, the concentrations of the impurity element in the regions 612b and 612c are higher than those in the regions 612a and 612d. Note that the concentrations of the impurity element in the regions 612b and 612c which are measured by secondary ion mass spectrometry can be greater than or equal to $1 \times 10^{18}$ atoms/cm$^3$ and less than or equal to $1 \times 10^{22}$ atoms/cm$^3$, greater than or equal to $1 \times 10^{19}$ atoms/cm$^3$ and less than or equal to $1 \times 10^{21}$ atoms/cm$^3$, or greater than or equal to $5 \times 10^{19}$ atoms/cm$^3$ and less than or equal to $5 \times 10^{20}$ atoms/cm$^3$.

The regions 612b and 612c have higher concentrations of hydrogen and larger amounts of oxygen vacancies due to addition of the rare gas element than the region 612d. Therefore, the regions 612b and 612c have higher conductivity and serve as low-resistance regions. The resistivity of the regions 612b and 612c can be typically greater than or equal to $1 \times 10^{-3}$ Ωcm and less than $1 \times 10^4$ Ωcm, or greater than or equal to $1 \times 10^{-3}$ Ωcm and less than $1 \times 10^{-1}$ Ωcm.

Note that when the amount of hydrogen in each of the regions 612b and 612c is the same as or smaller than the amount of oxygen vacancies therein, hydrogen is easily captured by oxygen vacancies and is less likely to be diffused to the region 612d serving as a channel. As a result, a transistor having normally-off characteristics can be obtained.

The region 612d serves as a channel.

In addition, after the impurity element is added to the oxide semiconductor film 612 using the conductive films 614, 616, and 618 as masks, the area of the conductive film 618 when seen from the above may be reduced. This can be performed in such a manner that a slimming process is performed on a mask over the conductive film 618 in a step of forming the conductive film 618 so as to obtain a mask with a minuter structure. Then, the conductive film 618 and the insulating film 617 are etched using the mask, so that a conductive film 618a and an insulating film 617a illustrated in FIG. 10B can be formed. As the slimming process, an ashing process using an oxygen radical or the like can be employed, for example.

As a result, an offset region 612e is formed between the region 612c and the region 612d serving as a channel in the oxide semiconductor film 612. Note that the length of the offset region 612e in the channel length direction is set to be less than 0.1 μm, whereby a decrease in the on-state current of the transistor can be suppressed.

The insulating film 617 and the insulating film 606 each function as a gate insulating film.

The conductive film 614 and the conductive film 616 serve as a source (source electrode or source terminal) and a drain (drain electrode or drain terminal), and the conductive film 604 and the conductive film 605 also serve as a source and a drain.

The conductive film 618 and the conductive film 607 each serve as a gate.

The transistor 600A and the transistor 600B described in this embodiment each include the region 612b and/or the region 612c functioning as a low-resistance region between the region 612d functioning as a channel and each of the regions 612a functioning as a source region and a drain region. Accordingly, the resistance between the channel and each of the source region and the drain region can be reduced, and the transistor 600A and the transistor 600B each have a high on-state current and a high field-effect mobility.

In addition, in the transistor 600A and the transistor 600B, parasitic capacitance between the conductive film 618 and each of the conductive films 614 and 616 can be reduced by forming the conductive film 618 so as not to overlap with the conductive films 614 and 616. Moreover, parasitic capacitance between the conductive film 607 and each of the conductive films 604 and 605 can be reduced by forming the conductive film 607 so as not to overlap with the conductive films 604 and 605. As a result, in the case where a large-sized substrate is used as the substrate 601, signal delays in the conductive films 614 and 616 and the conductive film 618, and signal delays in the conductive films 604 and 605 and the conductive film 607 can be reduced.

In the transistor 600A, a region including oxygen vacancies is formed by adding a rare gas element to the oxide semiconductor film 612 using the conductive films 614, 616, and 618 as masks. In the transistor 600B, the impurity element is added to the oxide semiconductor film 603 using the conductive films 604, 605, and 607 as masks, so that regions having oxygen vacancies are formed. Furthermore, because the region including oxygen vacancies is in contact with the insulating film 620 containing hydrogen, hydrogen contained in the insulating film 620 is diffused into the region including oxygen vacancies, so that a low-resistance region is formed. That is, the low-resistance regions can be formed in a self-aligned manner.

In the transistor 600A and the transistor 600B described in this embodiment, the rare gas element is added to the regions 612b to form oxygen vacancies, and furthermore, hydrogen is added thereto. Therefore, the conductivity of the region 612b can be increased and variation in conductivity of the region 612b among transistors can be reduced. That is, by adding the rare gas element and hydrogen to the region 612b, the conductivity of the region 612b can be controlled.

The structures shown in FIGS. 9A and 9B will be described below in detail.

The type of the substrate 601 is not limited to a certain type, and any of a variety of substrates can be used as the substrate 601. Examples of the substrate include a semiconductor substrate (e.g., a single crystal substrate or a silicon substrate), an SOI substrate, a glass substrate, a quartz substrate, a plastic substrate, a metal substrate, a stainless steel substrate, a substrate including stainless steel foil, a tungsten substrate, a substrate including tungsten foil, a flexible substrate, an attachment film, paper including a fibrous material, and a base material film. Examples of a glass substrate include a barium borosilicate glass substrate, an aluminoborosilicate glass substrate, and a soda lime glass substrate. Examples of a flexible substrate, an attachment film, a base material film, or the like are as follows: plastic typified by polyethylene terephthalate (PET), polyethylene naphthalate (PEN), and polyether sulfone (PES); a synthetic resin such as acrylic; polypropylene; polyester; polyvinyl fluoride; polyvinyl chloride; polyamide; polyimide; an aramid resin; an epoxy resin; an inorganic vapor deposition film; and paper. Specifically, the use of semiconductor substrates, single crystal substrates, SOI substrates, or the like enables the manufacture of small-sized transistors with a small variation in characteristics, size, shape, or the like and with high current capability. By forming a circuit with the use of such transistors, power consumption of the circuit can be reduced or the circuit can be highly integrated.

Still alternatively, a flexible substrate may be used as the substrate 601, and the transistors may be directly provided on the flexible substrate. Alternatively, a separation layer may be provided between the substrate 601 and each of the transistors. The separation layer can be used when part or the whole of a semiconductor device formed over the separation layer is completed and separated from the substrate 601 and transferred to another substrate. In such a case, the transistors can be transferred to a substrate having low heat resistance or a flexible substrate as well. For the above separation layer, a stack including inorganic films, which are a tungsten film and a silicon oxide film, or an organic resin film of polyimide or the like formed over a substrate can be used, for example.

Examples of a substrate to which the transistors are transferred include, in addition to the above-described substrates over which transistors can be formed, a paper substrate, a cellophane substrate, an aramid film substrate, a polyimide film substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), or the like), a leather substrate, a rubber substrate, and the like. When such a substrate is used, a transistor with excellent properties or a transistor with low power consumption can be formed, a device with high durability can be formed, high heat resistance can be provided, or reduction in weight or thickness can be achieved.

The insulating film 611 can be formed with a single layer or a stack using one or more of an oxide insulating film and a nitride insulating film. Note that an oxide insulating film is preferably used for at least a region of the insulating film 611 that is in contact with the oxide semiconductor films 603 and 612, in order to improve characteristics of the interface with the oxide semiconductor films 603 and 612. An oxide insulating film that releases oxygen by being heated is preferably used as the insulating film 611, in which case oxygen contained in the insulating film 611 can be moved to the oxide semiconductor films 603 and 612 by heat treatment.

The thickness of the insulating film 611 can be greater than or equal to 50 nm, greater than or equal to 100 nm and less than or equal to 3000 nm, or greater than or equal to 200 nm and less than or equal to 1000 nm. With the use of the thick insulating film 611, the amount of oxygen released from the insulating film 611 can be increased, and the interface states between the insulating film 611 and each of the oxide semiconductor films 603 and 612 and oxygen vacancies included in the oxide semiconductor film 603 and the region 612d of the oxide semiconductor film 612 can be reduced.

The insulating film 611 can be formed with a single layer or a stack using, for example, one or more of silicon oxide, silicon oxynitride, silicon nitride oxide, silicon nitride, aluminum oxide, hafnium oxide, gallium oxide, a Ga—Zn oxide, and the like.

The oxide semiconductor films 612 and 603 are typically formed using a metal oxide such as an In—Ga oxide, an In—Zn oxide, or an In-M-Zn oxide (M is Mg, Al, Sn, Ti, Ga, Y, Zr, La, Ce, Nd, or Hf). Note that the oxide semiconductor films 612 and 603 have light-transmitting properties.

Note that in the case of using an In-M-Zn oxide as the oxide semiconductor films 612 and 603, when the summation of In and M is assumed to be 100 atomic %, the proportions of In and M are preferably set to be greater than or equal to 25 atomic % and less than 75 atomic %, respectively, or greater than or equal to 34 atomic % and less than 66 atomic %, respectively.

The energy gaps of the oxide semiconductor films 612 and 603 are each 2 eV or more, 2.5 eV or more, or 3 eV or more.

The thickness of each of the oxide semiconductor films 612 and 603 can be greater than or equal to 3 nm and less than or equal to 200 nm, greater than or equal to 3 nm and less than or equal to 100 nm, or greater than or equal to 3 nm and less than or equal to 50 nm.

In the case where the oxide semiconductor films 612 and 603 contain an In-M-Zn oxide (M is Mg, Al, Ti, Ga, Sn, Y, Zr, La, Ce, Nd, or Hf), it is preferable that the atomic ratio of metal elements of a sputtering target used for forming a film of the In-M-Zn oxide satisfy In≥M and Zn≥M. As the atomic ratio of metal elements of such a sputtering target, In:M:Zn=1:1:1, In:M:Zn=1:1:1.2, In:M:Zn=2:1:1.5, In:M:Zn=2:1:2.3, In:M:Zn=2:1:3, In:M:Zn=3:1:2, or the like is preferable. Note that the atomic ratios of metal elements in the formed oxide semiconductor films 612 and 603 vary from the above atomic ratio of metal elements of the sputtering target within a range of ±40% as an error.

When silicon or carbon that is one of elements belonging to Group 14 is contained in the oxide semiconductor film 612 and the oxide semiconductor film 603, oxygen vacancies are increased in the oxide semiconductor film 612 and the oxide semiconductor film 603, and the oxide semiconductor film 612 and the oxide semiconductor film 603 become n-type films. Thus, the concentration of silicon or carbon (the concentration measured by SIMS) in the oxide semiconductor film 612 and the oxide semiconductor film 603, in particular, the region 612*d*, can be lower than or equal to $2 \times 10^{18}$ atoms/cm$^3$, or lower than or equal to $2 \times 10^{17}$ atoms/cm$^3$. As a result, the transistor has positive threshold voltage (normally-off characteristics).

Furthermore, the concentration of alkali metal or alkaline earth metal which is measured by SIMS in the oxide semiconductor film 612 and the oxide semiconductor film 603, in particular, the region 612*d*, can be lower than or equal to $1 \times 10^{18}$ atoms/cm$^3$, or lower than or equal to $2 \times 10^{16}$ atoms/cm$^3$. Alkali metal and alkaline earth metal might generate carriers when bonded to an oxide semiconductor, in which case the off-state current of the transistor might be increased. Therefore, it is preferable to reduce the concentration of an alkali metal or an alkaline earth metal in the region 612*d*. As a result, the transistor has positive threshold voltage (normally-off characteristics).

Furthermore, when nitrogen is contained in the oxide semiconductor film 612 and the oxide semiconductor film 603, in particular, the region 612*d*, electrons serving as carriers are generated, carrier density is increased, and the oxide semiconductor films 612 and 603 become n-type films in some cases. Thus, a transistor including an oxide semiconductor film which contains nitrogen is likely to have normally-on characteristics. Therefore, nitrogen is preferably reduced as much as possible in the oxide semiconductor film, particularly the region 612*d*. The nitrogen concentration, which is measured by SIMS, can be set to, for example, lower than or equal to $5 \times 10^{18}$ atoms/cm$^3$.

By reducing the impurity elements in the oxide semiconductor film 612 and the oxide semiconductor film 603, in particular, the region 612*d*, the carrier density of the oxide semiconductor films can be lowered. In the oxide semiconductor film 612 and the oxide semiconductor film 603, in particular, the region 612*d*, the carrier density can be greater than or equal to $1 \times 10^{-9}$/cm$^3$ and less than or equal to $1 \times 10^{17}$/cm$^3$, greater than or equal to $1 \times 10^{-9}$/cm$^3$ and less than or equal to $1 \times 10^{15}$/cm$^3$, greater than or equal to $1 \times 10^{-9}$/cm$^3$ and less than or equal to $1 \times 10^{13}$/cm$^3$, greater than or equal to $1 \times 10^{-9}$/cm$^3$ and less than $8 \times 10^{11}$/cm$^3$, greater than or equal to $1 \times 10^{-9}$/cm$^3$ and less than or equal to $1 \times 10^{11}$/cm$^3$, or greater than or equal to $1 \times 10^{-9}$/cm$^3$ and less than $1 \times 10^{10}$/cm$^3$.

An oxide semiconductor film with a low impurity concentration and a low density of defect states can be used for the oxide semiconductor films 612 and 603, in which case the transistors can have more excellent electrical characteristics. Here, the state in which impurity concentration is low and density of defect states is low (the amount of oxygen vacancies is small) is referred to as "highly purified intrinsic" or "substantially highly purified intrinsic". A highly purified intrinsic or substantially highly purified intrinsic oxide semiconductor has few carrier generation sources, and thus has a low carrier density in some cases. Thus, a transistor including the oxide semiconductor film in which a channel region is formed is likely to have positive threshold voltage (normally-off characteristics). A highly purified intrinsic or substantially highly purified intrinsic oxide semiconductor film has a low density of defect states and accordingly has low density of trap states in some cases. Furthermore, a highly purified intrinsic or substantially highly purified intrinsic oxide semiconductor film has an extremely small off-state current; the off-state current can be smaller than or equal to the measurement limit of a semiconductor parameter analyzer, i.e., smaller than or equal to $1 \times 10^{-13}$ A, at a voltage between a source and a drain of from 1 V to 10 V. Thus, the transistor whose channel region is formed in the oxide semiconductor film has a small variation in electrical characteristics and high reliability in some cases.

In addition, each of the oxide semiconductor films 612 and 603 may have a non-single-crystal structure, for example. The non-single-crystal structure includes a c-axis aligned crystalline oxide semiconductor (CAAC-OS) which is described later, a polycrystalline structure, a microcrystalline structure which is described later, or an amorphous structure, for example. Among the non-single-crystal structures, the amorphous structure has the highest density of defect states, whereas CAAC-OS has the lowest density of defect states.

Note that each of the oxide semiconductor films 612 and 603 may be a mixed film including two or more of the following: a region having an amorphous structure, a region having a microcrystalline structure, a region having a polycrystalline structure, a region of CAAC-OS, and a region having a single crystal structure. The mixed film has a single-layer structure including, for example, two or more of a region having an amorphous structure, a region having a microcrystalline structure, a region having a polycrystalline structure, a CAAC-OS region, and a region having a single crystal structure in some cases. Furthermore, the mixed film has a stacked-layer structure including, for example, two or more of a region having an amorphous structure, a region having a microcrystalline structure, a region having a polycrystalline structure, a CAAC-OS region, and a region having a single crystal structure in some cases.

Note that in some cases, the regions 612*b* and 612*d* are different in crystallinity in each of the oxide semiconductor films 612 and 603. In addition, in some cases, the regions 612*c* and 612*d* are different in crystallinity in each of the oxide semiconductor films 612 and 603. This is because when an impurity element is added to the region 612*b* or 612*c*, the region 612*b* or 612*c* is damaged and thus has lower crystallinity.

The insulating films 606 and 617 can be formed with a single layer or a stack using one or more of an oxide insulating film and a nitride insulating film. Note that an oxide insulating film is preferably used for at least regions of the insulating films 606 and 617 that are in contact with the oxide semiconductor films 603 and 612, respectively, in order to improve characteristics of the interface with the oxide semiconductor films 603 and 612. The insulating films 606 and 617 can be formed with a single layer or a stack using, for example, one or more of silicon oxide, silicon oxynitride, silicon nitride oxide, silicon nitride, aluminum oxide, hafnium oxide, gallium oxide, a Ga—Zn oxide, and the like.

Furthermore, it is possible to prevent outward diffusion of oxygen from the oxide semiconductor films 612 and 603 and entry of hydrogen, water, or the like into the oxide semiconductor films 612 and 603 from the outside by providing an insulating film having a blocking effect against oxygen, hydrogen, water, and the like as the insulating films 606 and 617. As the insulating film which has an effect of blocking oxygen, hydrogen, water, and the like, an aluminum oxide film, an aluminum oxynitride film, a gallium oxide film, a gallium oxynitride film, an yttrium oxide film, an yttrium oxynitride film, a hafnium oxide film, a hafnium oxynitride film, or the like can be used.

The insulating films 606 and 617 may be formed using a high-k material such as hafnium silicate (HfSiO$_x$), hafnium silicate to which nitrogen is added (HfSi$_x$O$_y$N$_z$), hafnium aluminate to which nitrogen is added (HfAl$_x$O$_y$N$_z$), hafnium oxide, or yttrium oxide, so that gate leakage current of the transistors can be reduced.

When the insulating films 606 and 617 are formed using an oxide insulating film from which oxygen is released by heating, oxygen contained in the insulating films 606 and 617 can be moved to the oxide semiconductor films 603 and 612 by heat treatment.

In addition, a silicon oxynitride film with few defects can be used as the insulating films 606 and 617. In an ESR spectrum at 100 K or lower of the silicon oxynitride film with few defects, after heat treatment, a first signal that appears at a g-factor of greater than or equal to 2.037 and less than or equal to 2.039, a second signal that appears at a g-factor of greater than or equal to 2.001 and less than or equal to 2.003, and a third signal that appears at a g-factor of greater than or equal to 1.964 and less than or equal to 1.966 are observed. The split width of the first and second signals and the split width of the second and third signals that are obtained by ESR measurement using an X-band are each approximately 5 mT. In the silicon oxynitride film with few defects, the sum of the spin densities of the first to third signals is less than $1\times10^{18}$ spins/cm$^3$, typically greater than or equal to $1\times10^{17}$ spins/cm$^3$ and less than $1\times10^{18}$ spins/cm$^3$.

In the ESR spectrum at 100 K or lower, the first signal, the second signal, and the third signal correspond to signals attributed to nitrogen oxide (NO$_x$; x is greater than 0 and less than or equal to 2, or greater than or equal to 1 and less than or equal to 2). In other words, the lower the sum of the spin densities of the first to third signals is, the smaller the amount of nitrogen oxide contained in the silicon oxynitride film is.

In the silicon oxynitride film with few defects, the concentration of nitrogen which is measured by SIMS is lower than or equal to $6\times10^{20}$ atoms/cm$^3$. When the insulating film 617 is formed using the silicon oxynitride film with few defects, nitrogen oxide is unlikely to be generated, so that the carrier traps at the interface between the oxide semiconductor films 612 and 603 and the insulating films can be reduced. Furthermore, a shift of the threshold voltage of the transistor included in the display device can be reduced, which leads to a reduced change in the electrical characteristics of the transistor.

The thickness of the insulating films 606 and 617 can be greater than or equal to 5 nm and less than or equal to 400 nm, greater than or equal to 5 nm and less than or equal to 300 nm, or greater than or equal to 10 nm and less than or equal to 250 nm.

Each of the conductive film 614, the conductive film 616, the conductive film 618, the conductive film 604, the conductive film 605, the conductive film 602, and the conductive film 607 can be formed using, for example, a metal element selected from aluminum, chromium, copper, tantalum, titanium, molybdenum, nickel, iron, cobalt, and tungsten; an alloy containing any of these metal elements as a component; an alloy containing these metal elements in combination; or the like. Further, one or more metal elements selected from manganese and zirconium may be used. Furthermore, the conductive film 614, the conductive film 616, the conductive film 618, the conductive film 604, the conductive film 605, the conductive film 602, and the conductive film 607 may have a single-layer structure or a stacked-layer structure including two or more layers. For example, any of the following can be used: a single-layer structure of an aluminum film containing silicon; a single-layer structure of a copper film containing manganese; a two-layer structure in which a titanium film is stacked over an aluminum film; a two-layer structure in which a titanium film is stacked over a titanium nitride film; a two-layer structure in which a tungsten film is stacked over a titanium nitride film; a two-layer structure in which a tungsten film is stacked over a tantalum nitride film or a tungsten nitride film; a two-layer structure in which a copper film is stacked over a copper film containing manganese; a three-layer structure in which a titanium film, an aluminum film, and a titanium film are stacked in this order; a three-layer structure in which a copper film containing manganese, a copper film, and a copper film containing manganese are stacked in this order; and the like. Alternatively, an alloy film or a nitride film which contains aluminum and one or more elements selected from titanium, tantalum, tungsten, molybdenum, chromium, neodymium, and scandium may be used.

Alternatively, the conductive film 614, the conductive film 616, the conductive film 618, the conductive film 604, the conductive film 605, the conductive film 602, and the conductive film 607 can be formed using a light-transmitting conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide containing silicon oxide. Alternatively, a stacked-layer structure of the above light-transmitting conductive material and a conductive material containing the above metal element may be employed.

The thicknesses of the conductive films 614 and 616, the conductive film 618, the conductive films 604 and 605, the conductive film 602, and the conductive film 607 each can be greater than or equal to 30 nm and less than or equal to 500 nm, or greater than or equal to 100 nm and less than or equal to 400 nm.

The insulating film 620 is a film containing hydrogen and is typically a nitride insulating film. The nitride insulating film can be formed using silicon nitride, aluminum nitride, or the like.

<Structure Example 2 of Transistor>

Next, another structure of the transistor included in the display device is described with reference to FIGS. 11A to 11C. Description is made here using a transistor 600C as a modified example of the transistor 600A provided in the pixel portion 502; however, the structure of the insulating film 611 or the structure of the conductive film 614, 616, or 618 of the transistor 600C can be applied as appropriate to the transistor 600B in the column driver 504/the row driver 505.

Figure 11A:
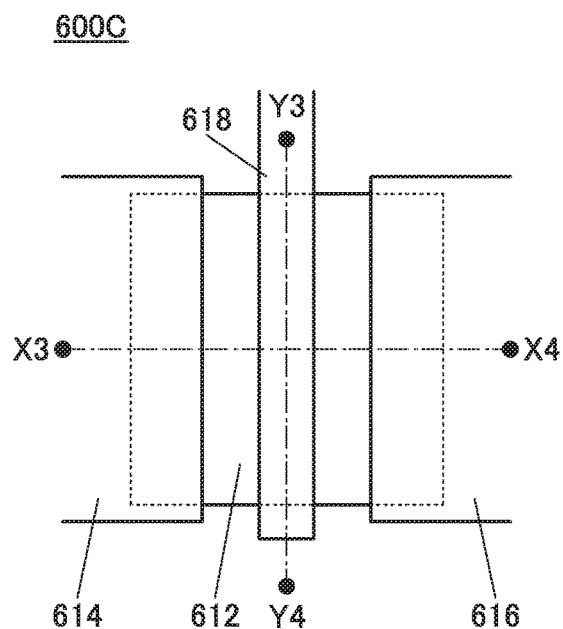
FIGS. 11A to 11C are a top view and cross-sectional views of a transistor.
Figure 11B:
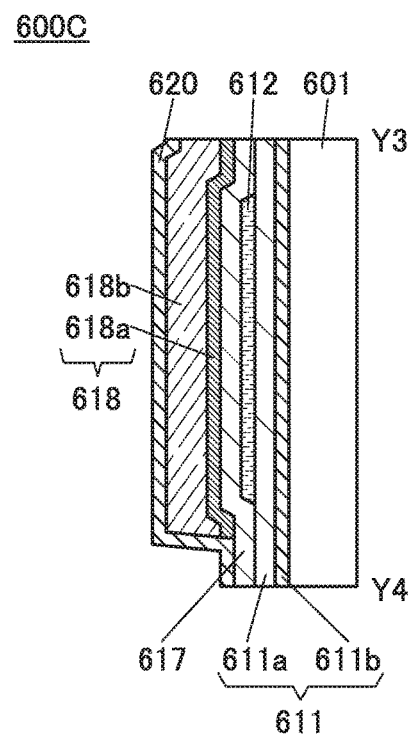
Figure 11C:
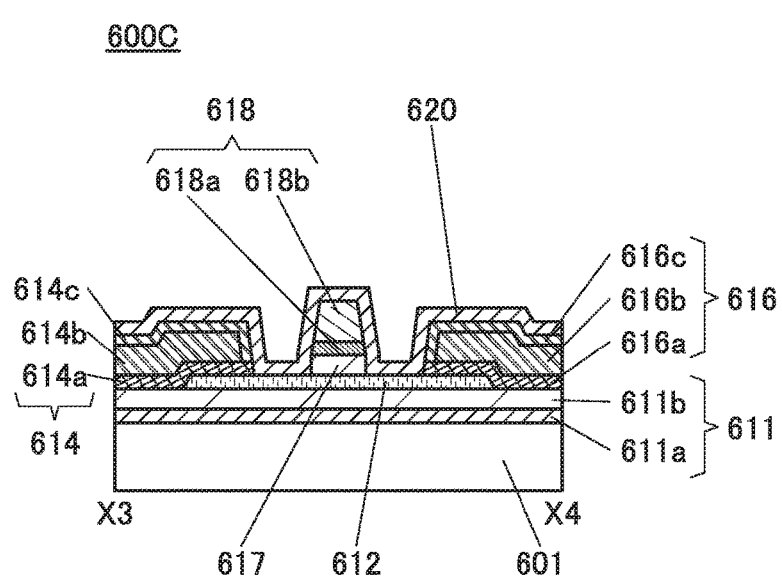

FIGS. 11A to 11C are a top view and cross-sectional views of the transistor 600C included in the display device. FIG. 11A is a top view of the transistor 600C, FIG. 11B is a cross-sectional view taken along the dashed-dotted line Y3-Y4 in FIG. 11A, and FIG. 11C is a cross-sectional view taken along the dashed-dotted line X3-X4 in FIG. 11A.

The transistor 600C illustrated in FIGS. 11A to 11C has a two- or three-layer structure of the conductive films 614 and 616 and the conductive film 618. In addition, the insulating film 611 has a stacked-layer structure of a nitride insulating film 611a and an oxide insulating film 611b. The other structures are the same as those of the transistor 600A and the effect similar to that in the case of the transistor 600A can be obtained.

First, the conductive films 614 and 616 and the conductive film 618 are described.

In the conductive film 614, conductive films 614a, 614b, and 614c are stacked in this order and the conductive films 614a and 614c cover the surfaces of the conductive film 614b. That is, the conductive films 614a and 614c function as protective films of the conductive film 614b.

In the conductive film 616, conductive films 616a, 616b, and 616c are stacked in this order and the conductive films 616a and 616c cover the surfaces of the conductive film 616b, as in the case of the conductive film 614. That is, the conductive films 616a and 616c function as protective films of the conductive film 616b.

In the conductive film 618, conductive films 618a and 618b are stacked in this order.

The conductive films 614a and 616a and the conductive film 618a are formed using materials that prevent metal elements contained in the conductive films 614b and 616b and the conductive film 618b, respectively, from diffusing to the oxide semiconductor film 612. The conductive films 614a and 616a and the conductive film 618a can be formed using titanium, tantalum, molybdenum, tungsten, an alloy of any of these, titanium nitride, tantalum nitride, molybdenum nitride, tantalum nitride, or the like. Alternatively, the conductive films 614a and 616a and the conductive film 618a can be formed using a Cu—X alloy (X is Mn, Ni, Cr, Fe, Co, Mo, Ta, or Ti) or the like.

The conductive films 614b and 616b and the conductive film 618b are each formed using a low-resistance material. The conductive films 614b and 616b and the conductive film 618b can be formed using copper, aluminum, gold, silver, an alloy of any of these, a compound containing any of these as a main component, or the like.

When the conductive films 614c and 616c are formed using films in which the metal elements contained in the conductive films 614b and 616b, respectively, are passivated, the metal elements contained in the conductive films 614b and 616b can be prevented from moving to the oxide semiconductor film 612 in a step of forming the insulating film 628. The conductive films 614c and 616c can be formed using a metal silicide or a metal silicide nitride, typically, $CuSi_x$ (x>0), $CuSi_xN_y$ (x>0, y>0), or the like.

Here, a method for forming the conductive films 614c and 616c is described. Note that the conductive films 614b and 616b are formed using copper. In addition, the conductive films 614c and 616c are formed using $CuSi_xN_y$ (x>0, y>0).

The conductive films 614b and 616b are exposed to plasma generated in a reducing atmosphere such as a hydrogen atmosphere, an ammonia atmosphere, or a carbon monoxide atmosphere and the oxide formed on the surfaces of the conductive films 614b and 616b are reduced.

Next, the conductive films 614b and 616b are exposed to silane while being heated at a temperature higher than or equal to 200° C. and lower than or equal to 400° C. As a result, copper contained in the conductive films 614b and 616b acts as a catalyst, and silane is decomposed into Si and $H_2$, and $CuSi_x$ (x>0) is formed on the surfaces of the conductive films 614b and 616b.

Next, the conductive films 614b and 616b are exposed to plasma generated in an atmosphere containing nitrogen, such as an ammonia atmosphere or a nitrogen atmosphere, whereby $CuSi_x$ (x>0) formed on the surfaces of the conductive films 614b and 616b reacts with nitrogen contained in the plasma and accordingly $CuSi_xN_y$ (x>0, y>0) is formed as the conductive films 614c and 616c.

Note that in the above step, $CuSi_xN_y$ (x>0, y>0) may be formed as the conductive films 614c and 616c in such a manner that the conductive films 614b and 616b are exposed to plasma generated in an atmosphere containing nitrogen, such as an ammonia atmosphere or a nitrogen atmosphere, and then exposed to silane while being heated at a temperature higher than or equal to 200° C. and lower than or equal to 400° C.

Next, the insulating film 611 in which the nitride insulating film 611a and the oxide insulating film 611b are stacked is described.

The nitride insulating film 611a can be formed using silicon nitride, silicon nitride oxide, aluminum nitride, or aluminum nitride oxide, for example. The oxide insulating film 611b can be formed using silicon oxide, silicon oxynitride, aluminum oxide, or the like, for example. The structure in which the nitride insulating film 611a is provided on the substrate 601 side can prevent hydrogen, water, or the like from diffusing to the oxide semiconductor film 612 from the outside.

<Structure Example 3 of Transistor>

Next, another structure of the transistor included in the display device is described with reference to FIGS. 12A to 12C and FIGS. 13A to 13C. Description is made here using a transistor 600D and a transistor 600E as modified examples of the transistor 600A provided in the pixel portion 502; however, the structure of the oxide semiconductor film 612 included in the transistor 600D or the structure of the oxide semiconductor film 612 included in the transistor 600E can be applied as appropriate to the transistor 600B in the column driver 504/the row driver 505.

Figure 12A:
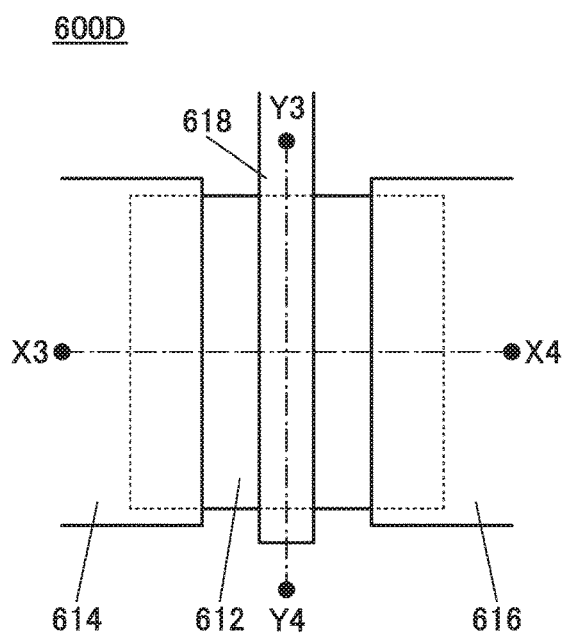
FIGS. 12A to 12C are a top view and cross-sectional views of a transistor.
Figure 12B:
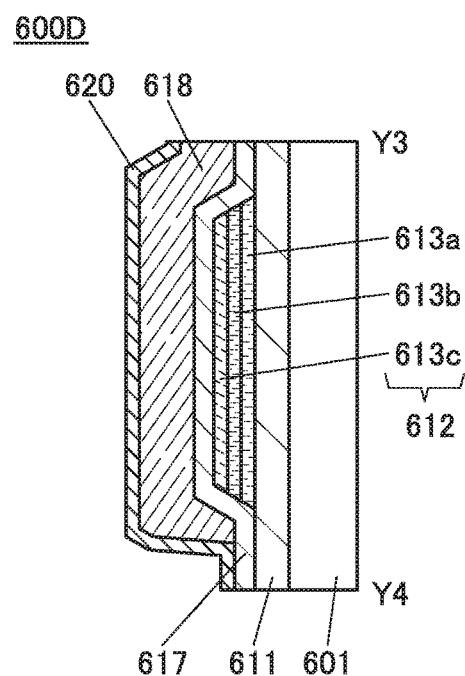
Figure 12C:
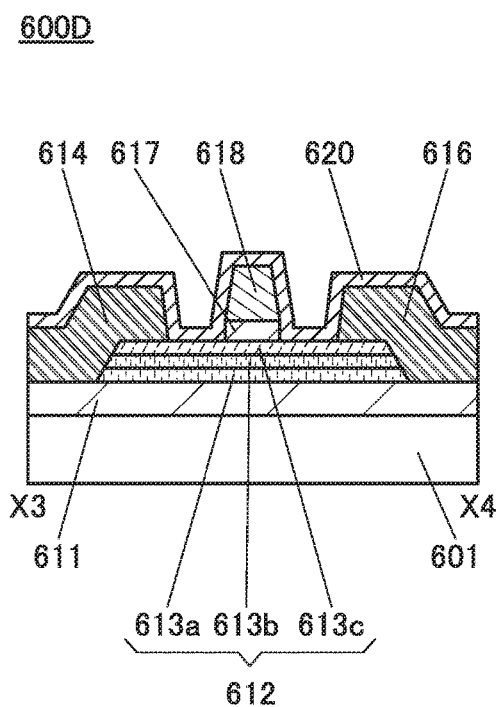

FIGS. 12A to 12C are a top view and cross-sectional views of the transistor 600D included in the display device. FIG. 12A is a top view of the transistor 600D, FIG. 12B is a cross-sectional view taken along the dashed-dotted line Y3-Y4 in FIG. 12A, and FIG. 12C is a cross-sectional view taken along the dashed-dotted line X3-X4 in FIG. 12A.

The oxide semiconductor film 612 of the transistor 600D illustrated in FIGS. 12A to 12C has a multilayer structure. Specifically, the oxide semiconductor film 612 includes an oxide semiconductor film 613a in contact with the insulating film 611, an oxide semiconductor film 613b in contact with the oxide semiconductor film 613a, and an oxide semiconductor film 613c in contact with the oxide semiconductor film 613b, the conductive films 614 and 616, and the insulating films 617 and 620. The other structures are the same as those of the transistor 600A and the effect similar to that in the case of the transistor 600A can be obtained.

The oxide semiconductor films 613a, 613b, and 613c are typically formed using a metal oxide such as an In—Ga oxide, an In—Zn oxide, or an In-M-Zn oxide (M is Mg, Al, Ti, Ga, Y, Zr, La, Ce, Nd, or Hf).

The oxide semiconductor films 613a and 613c are typically each an In—Ga oxide, an In—Zn oxide, an In—Mg oxide, a Zn—Mg oxide, or an In-M-Zn oxide (M is Mg, Al, Ti, Ga, Y, Zr, La, Ce, Nd, or Hf), and each have the energy at the bottom of the conduction band closer to a vacuum level than that of the oxide semiconductor film 613b. Typically, a difference between the energy at the bottom of the conduction band of the oxide semiconductor film 613b and the energy at the bottom of the conduction band of each of the oxide semiconductor films 613a and 613c is greater than or equal to 0.05 eV, greater than or equal to 0.07 eV, greater than or equal to 0.1 eV, or greater than or equal to 0.2 eV and also less than or equal to 2 eV, less than or equal to 1 eV, less than or equal to 0.5 eV, or less than or equal to 0.4 eV. Note that the difference between the vacuum level and the energy at the bottom of the conduction band is referred to as electron affinity.

In the case where the oxide semiconductor film 613b is an In-M-Zn oxide (M is Mg, Al, Ti, Ga, Y, Zr, La, Ce, Nd, or Hf) and a target having the atomic ratio of metal elements of In:M:Zn=$x_1$:$y_1$:$z_1$ is used for forming the oxide semiconductor film 613b, $x_1/y_1$ is preferably greater than or equal to ⅓ and less than or equal to 6, or further preferably greater than or equal to 1 and less than or equal to 6, and $z_1/y_1$ is preferably greater than or equal to ⅓ and less than or equal to 6, or further preferably greater than or equal to 1 and less than or equal to 6. Note that when $z_1/y_1$ is greater than or equal to 1 and less than or equal to 6, a CAAC-OS film as the oxide semiconductor film 613b is easily formed. As typical examples of the atomic ratio of metal elements of the target, InM:Zn=1:1:1, In:M:Zn=1:1:1.2, In:M:Zn=2:1:1.5, In:M:Zn=2:1:2.3, In:M:Zn=2:1:3, In:M:Zn=3:1:2, and the like can be given.

In the case where the oxide semiconductor films 613a and 613c are each an In-M-Zn oxide (M is Mg, Al, Ti, Ga, Y, Zr, La, Ce, Nd, or Hf) and a target having the atomic ratio of metal elements of In:M:Zn=$x_2$:$y_2$:$z_2$ is used for forming the oxide semiconductor films 613a and 613c, $x_2/y_2$ is preferably less than $x_1/y_1$, and $z_2/y_2$ is preferably greater than or equal to ⅓ and less than or equal to 6, or further preferably greater than or equal to 1 and less than or equal to 6. Note that when $z_2/y_2$ is greater than or equal to 1 and less than or equal to 6, a CAAC-OS film as the oxide semiconductor films 613a and 613c is easily formed. As typical examples of the atomic ratio of metal elements of the target, In:M:Zn=1:3:2, In:M:Zn=1:3:4, In:M:Zn=1:3:6, In:M:Zn=1:3:8, In:M:Zn=1:4:3, In:M:Zn=1:4:4, In:M:Zn=1:4:5, In:M:Zn=1:4:6, In:M:Zn=1:6:3, In:M:Zn=1:6:4, In:M:Zn=1:6:5, In:M:Zn=1:6:6, In:M:Zn=1:6:7, In:M:Zn=1:6:8, In:M:Zn=1:6:9, and the like can be given.

Note that a proportion of each atom in the atomic ratio of the oxide semiconductor films 613a, 613b, and 613c varies within a range of ±40% as an error.

The atomic ratio is not limited to the above, and the atomic ratio may be appropriately set in accordance with needed semiconductor characteristics.

The oxide semiconductor film 613a and the oxide semiconductor film 613c may have the same composition. For example, as the oxide semiconductor film 613a and the oxide semiconductor film 613c, an In—Ga—Zn oxide in which the atomic ratio of In to Ga and Zn is 1:3:2, 1:3:4, 1:4:5, 1:4:6, 1:4:7, or 1:4:8 may be used.

Alternatively, the oxide semiconductor films 613a and 613c may have different compositions. For example, an In—Ga—Zn oxide film in which the atomic ratio of In to Ga and Zn is 1:3:2 may be used as the oxide semiconductor film 613a, whereas an In—Ga—Zn oxide film in which the atomic ratio of In to Ga and Zn is 1:3:4 or 1:4:5 may be used as the oxide semiconductor film 613c.

The thickness of each of the oxide semiconductor films 613a and 613c is greater than or equal to 3 nm and less than or equal to 100 nm, or greater than or equal to 3 nm and less than or equal to 50 nm. The thickness of the oxide semiconductor film 613b is greater than or equal to 3 nm and less than or equal to 200 nm, greater than or equal to 3 nm and less than or equal to 100 nm, or greater than or equal to 3 nm and less than or equal to 50 nm. When the thicknesses of the oxide semiconductor films 613a and 613c are made smaller than that of the oxide semiconductor film 613b, the amount of change in the threshold voltage of the transistor can be reduced.

The interface between the oxide semiconductor film 613b and each of the oxide semiconductor films 613a and 613c can be observed by scanning transmission electron microscopy (STEM) in some cases.

Oxygen vacancies in the oxide semiconductor film 613b can be reduced by providing the oxide semiconductor films 613a and 613c in which oxygen vacancies are less likely to be generated than the oxide semiconductor film 613b in contact with the upper surface and the lower surface of the oxide semiconductor film 613b. Furthermore, since the oxide semiconductor film 613b is in contact with the oxide semiconductor films 613a and 613c containing one or more metal elements forming the oxide semiconductor film 613b, the interface state densities between the oxide semiconductor film 613a and the oxide semiconductor film 613b and between the oxide semiconductor film 613b and the oxide semiconductor film 613c are extremely low. Accordingly, oxygen vacancies contained in the oxide semiconductor film 613b can be reduced.

In addition, with the oxide semiconductor film 613a, variation in the electrical characteristics of the transistor, such as a threshold voltage, can be reduced.

Since the oxide semiconductor film 613c containing one or more metal elements forming the oxide semiconductor film 613b is provided in contact with the oxide semiconductor film 613b, scattering of carriers does not easily occur at the interface between the oxide semiconductor film 613b and the oxide semiconductor film 613c, and thus the field-effect mobility of the transistor can be increased.

Furthermore, the oxide semiconductor films 613a and 613c each also serve as a barrier film which suppresses formation of an impurity state due to the entry of the constituent elements of the insulating films 611 and 617 into the oxide semiconductor film 613b.

As described above, in the transistors described in this embodiment, variation in the electrical characteristics, such as a threshold voltage, is reduced.

Figure 13A:
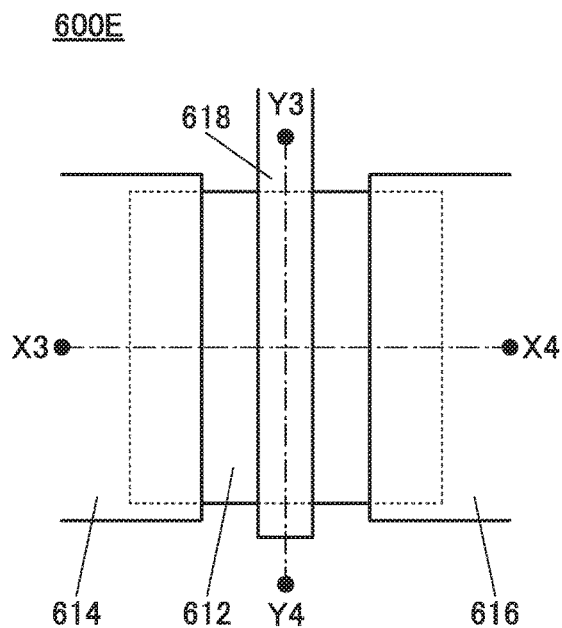
FIGS. 13A to 13C are a top view and cross-sectional views of a transistor.
Figure 13B:
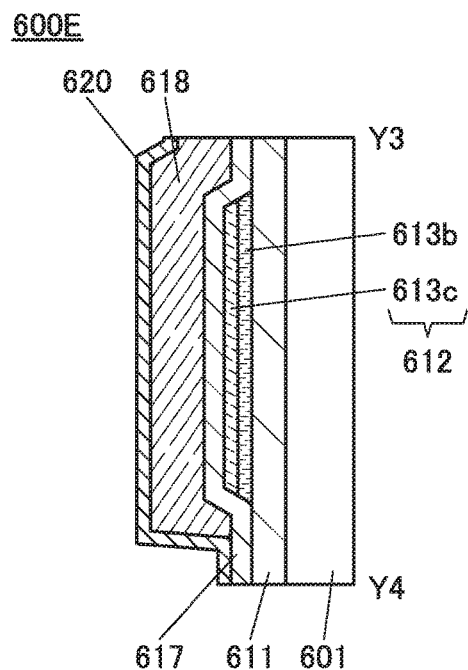
Figure 13C:
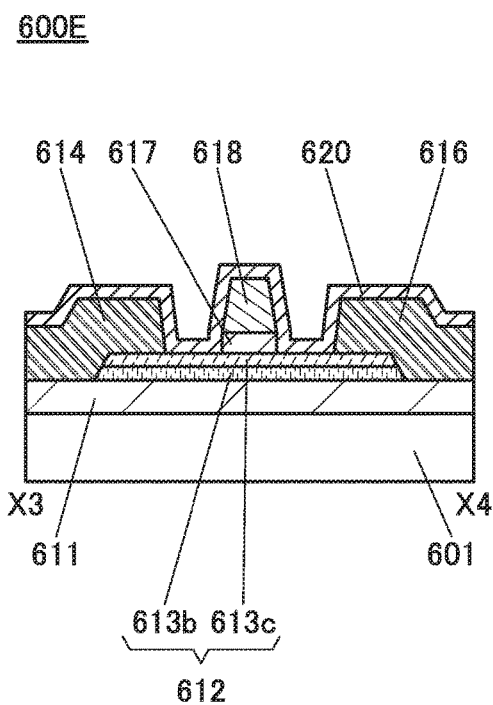

A transistor having a structure different from that in FIGS. 12A to 12C is illustrated in FIGS. 13A to 13C.

FIGS. 13A to 13C are a top view and cross-sectional views of the transistor 600E included in the display device. FIG. 13A is a top view of the transistor 600E, FIG. 13B is a cross-sectional view taken along the dashed-dotted line Y3-Y4 in FIG. 13A, and FIG. 13C is a cross-sectional view taken along the dashed-dotted line X3-X4 in FIG. 13A. Note that in FIG. 13A, the substrate 601, the insulating films 611, 617, and 620, and the like are omitted for simplicity. FIG. 13B is the cross-sectional view of the transistor 600E in the channel width direction. Moreover, FIG. 13C is the cross-sectional view of the transistor 600E in the channel length direction.

Like the oxide semiconductor film 612 of the transistor 600E illustrated in FIGS. 13A to 13C, the oxide semiconductor film 612 may have a stacked-layer structure of the oxide semiconductor film 613b in contact with the insulating film 611 and the oxide semiconductor film 613c in contact with the oxide semiconductor film 613b and the insulating film 617.

<Band Structure>

Figure 18A:
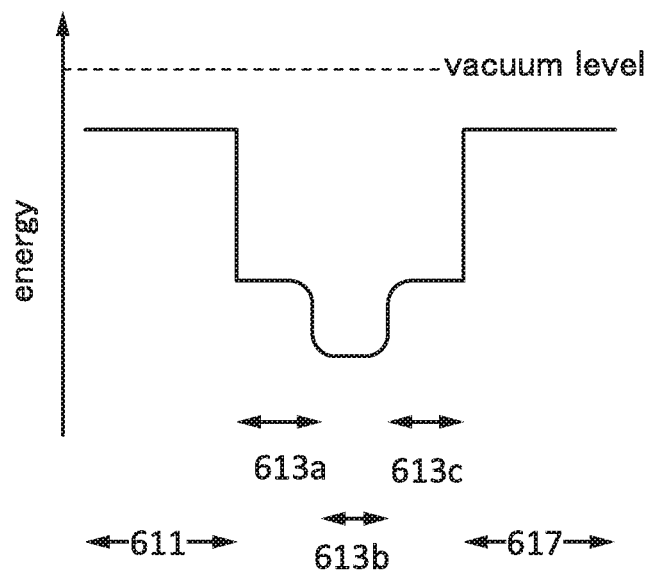
FIGS. 18A and 18B are conceptual diagrams each showing a band structure of a transistor.
Figure 18B:
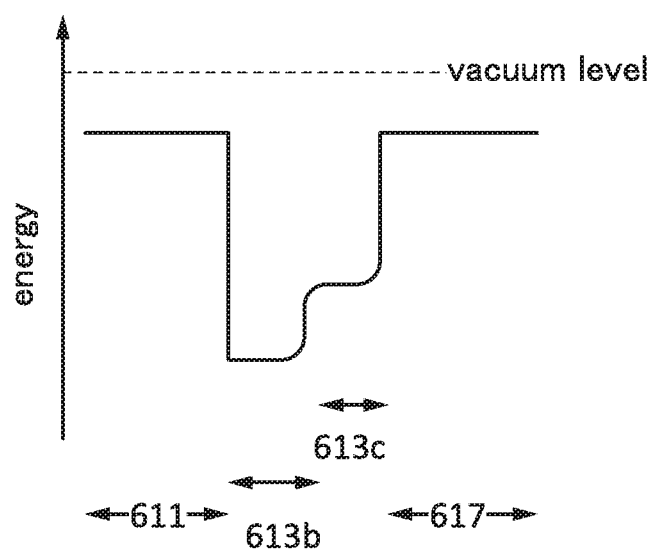

Here, the band structures of the transistor illustrated in FIGS. 12A to 12C and the transistor illustrated in FIGS. 13A to 13C are described. Note that FIG. 18A shows the band structure of the transistor 600D illustrated in FIGS. 12A to 12C, and for easy understanding, the energy ($E_e$) of the bottom of the conduction band of each of the insulating film 611, the oxide semiconductor films 613a, 613b, and 613c, and the insulating film 617 is shown. FIG. 18B shows the band structure of the transistor 600E illustrated in FIGS. 13A to 13C, and for easy understanding, the energy ($E_e$) of the bottom of the conduction band of each of the insulating film 611, the oxide semiconductor films 613b and 613c, and the insulating film 617 is shown.

As illustrated in FIG. 18A, the energies at the bottoms of the conduction bands are changed continuously in the oxide semiconductor films 613a, 613b, and 613c. This can be understood also from the fact that the constituent elements are common among the oxide semiconductor films 613a, 613b, and 613c and oxygen is easily diffused among the oxide semiconductor films 613a to 613c. Thus, the oxide semiconductor films 613a, 613b, and 613c have a continuous physical property although they are a stack of films having different compositions.

The oxide semiconductor films that are stacked and contain the same main components have not only a simple stacked-layer structure of the layers but also a continuous energy band (here, in particular, a well structure having a U shape in which energies at the bottoms of the conduction bands are changed continuously between layers (U-shaped well)). That is, the stacked-layer structure is formed so that a defect state which serves as a trap center or a recombination center in an oxide semiconductor, or an impurity which inhibits the flow of carriers does not exist at interfaces between the layers. If impurities are mixed between the oxide semiconductor films stacked, the continuity of the energy band is lost and carriers disappear by a trap or recombination.

Note that FIG. 18A illustrates the case where the E of the oxide semiconductor film 613a and the $E_e$ of the oxide semiconductor film 613c are equal to each other; however, they may be different from each other.

As illustrated in FIG. 18A, the oxide semiconductor film 613b serves as a well and a channel of the transistor 600D is formed in the oxide semiconductor film 613b. Note that since the energies at the bottoms of the conduction bands are changed continuously in the oxide semiconductor films 613a, 613b, and 613c, a channel in the well structure having a U shape can also be referred to as a buried channel.

As illustrated in FIG. 18B, the energies at the bottoms of the conduction bands are changed continuously in the oxide semiconductor films 613b and 613c.

As illustrated in FIG. 18B, the oxide semiconductor film 613b serves as a well and a channel of the transistor 600E is formed in the oxide semiconductor film 613b.

The transistor 600D illustrated in FIGS. 12A to 12C includes the oxide semiconductor films 613a and 613c containing one or more metal elements forming the semiconductor film 613b; therefore, interface states are not easily formed at the interface between the oxide semiconductor film 613a and the oxide semiconductor film 613b and the interface between the oxide semiconductor film 613c and the oxide semiconductor film 613b. Thus, with the oxide semiconductor films 613a and 613c, variation or change in the electrical characteristics of the transistor, such as a threshold voltage, can be reduced.

The transistor 600E illustrated in FIGS. 13A to 13C includes the oxide semiconductor film 613c containing one or more metal elements forming the semiconductor film 613b; therefore, an interface state is not easily formed at the interface between the oxide semiconductor film 613c and the oxide semiconductor film 613b. Thus, with the oxide semiconductor film 613c, variation or change in the electrical characteristics of the transistor, such as a threshold voltage, can be reduced.

<Structure Example 4 of Transistor>

Next, another structure of the transistor included in the display device is described with reference to FIGS. 15A to 15D.

Figure 15A:
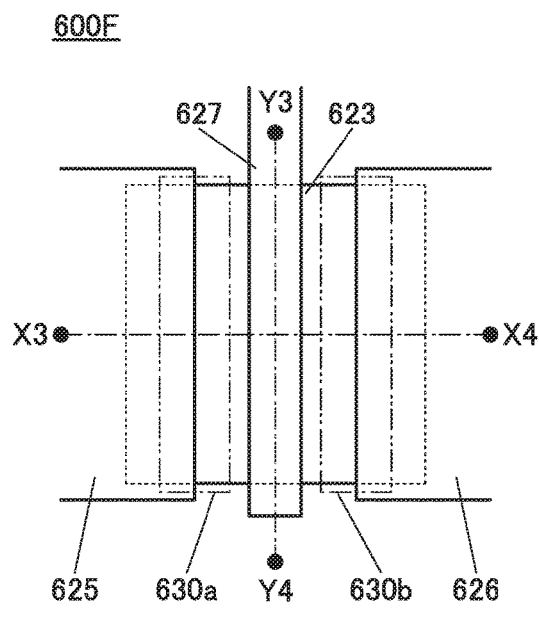
FIGS. 15A to 15D are a top view and cross-sectional views of a transistor.
Figure 15B:
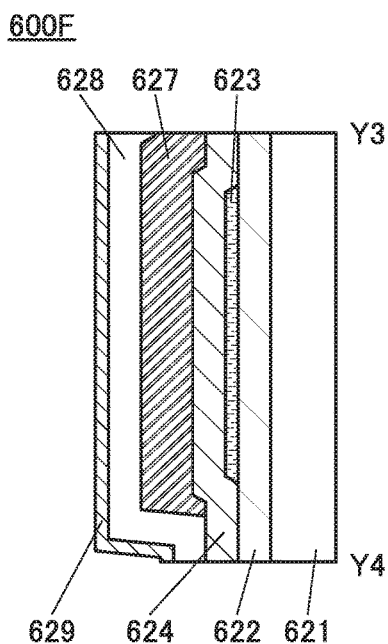
Figure 15C:
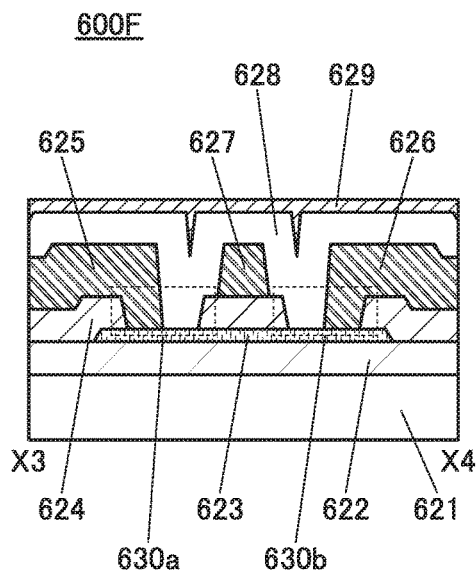

FIGS. 15A to 15C are a top view and cross-sectional views of a driving transistor 600F included in the display device. FIG. 15A is a top view of the driving transistor 600F, FIG. 15B is a cross-sectional view taken along the dashed-dotted line Y3-Y4 in FIG. 15A, and FIG. 15C is a cross-sectional view taken along the dashed-dotted line X3-X4 in FIG. 15A.

The driving transistor 600F illustrated in FIGS. 15A to 15D includes an oxide semiconductor film 623 over an insulating film 622 formed over a substrate 621, an insulating film 624 in contact with the oxide semiconductor film 623, a conductive film 625 in contact with the oxide semiconductor film 623 in part of an opening 630a formed in the insulating film 624, a conductive film 626 in contact with the oxide semiconductor film 623 in part of an opening 630b formed in the insulating film 624, and a conductive film 627 overlapping with the oxide semiconductor film 623 with the insulating film 624 provided therebetween. Note that the insulating film 628 and an insulating film 629 may be provided over the driving transistor 600F.

Regions of the oxide semiconductor film 623 overlapping with neither the conductive films 625 and 626 nor the conductive film 627 each include an element that forms an oxygen vacancy. An element that forms an oxygen vacancy is described below as an impurity element. Typical examples of the impurity element are hydrogen, boron, carbon, nitrogen, fluorine, aluminum, silicon, phosphorus, chlorine, a rare gas element, and the like. Typical examples of the rare gas element are helium, neon, argon, krypton, and xenon.

When the impurity element is added to the oxide semiconductor film, a bond between a metal element and oxygen in the oxide semiconductor film is cut, whereby an oxygen vacancy is formed. When the impurity element is added to the oxide semiconductor film, oxygen bonded to a metal element in the oxide semiconductor film is bonded to the impurity element, whereby oxygen is detached from the metal element and accordingly an oxygen vacancy is formed. As a result, the oxide semiconductor film has a higher carrier density and thus the conductivity thereof becomes higher.

Figure 15D:
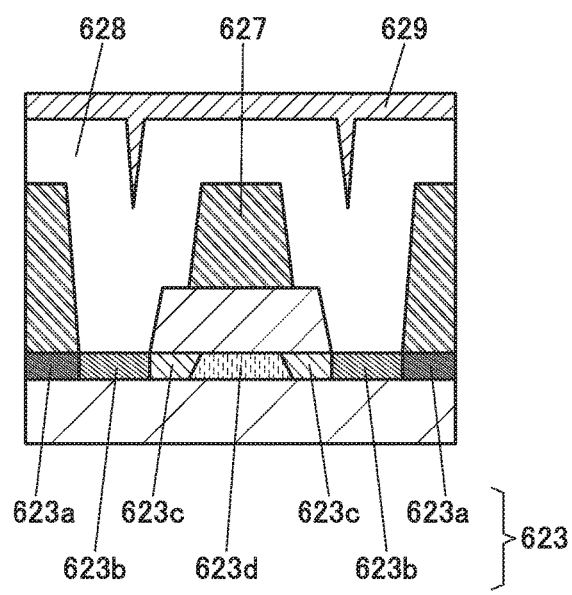

Here, FIG. 15D is a partial enlarged view of the oxide semiconductor film 623. As illustrated in FIG. 15D, the oxide semiconductor film 623 includes regions 623a in contact with the conductive films 625 and 626, regions 623b in contact with the insulating film 628, and regions 623c and a region 623d overlapping with the insulating film 624.

The regions 623a have high conductivity and function as a source region and a drain region in a manner similar to that of the regions 612a illustrated in FIGS. 10A and 10B.

The regions 623b and 623c function as low-resistance regions. The regions 623b and 623c contain an impurity element. Note that the concentrations of the impurity element in the regions 623b are higher than those in the regions 623c. Note that in the case where the conductive film 627 has a tapered side surface, part of the regions 623c may overlap with the conductive film 627.

In the case where a rare gas element is used as the impurity element and the oxide semiconductor film 623 is formed by a sputtering method, the regions 623a to 623d contain the rare gas element, and the concentrations of the rare gas elements in the regions 623b and 623c are higher than those in the regions 623a and 623d. This is due to the fact that in the case where the oxide semiconductor film 623 is formed by a sputtering method, the rare gas element is contained in the oxide semiconductor film 623 because the rare gas element is used as a sputtering gas and the rare gas element is intentionally added to the oxide semiconductor film 623 in order to form oxygen vacancies in the regions 623b and 623c. Note that a rare gas element different from that in the regions 623a and 623d may be added to the regions 623b and 623c.

In the case where the impurity element is boron, carbon, nitrogen, fluorine, aluminum, silicon, phosphorus, or chlorine, only the regions 623b and 623c contain the impurity element. Therefore, the concentrations of the impurity element in the regions 623b and 623c are higher than those in the regions 623a and 623d. Note that the concentrations of the impurity element in the regions 623b and 623c which are measured by SIMS can be greater than or equal to $1 \times 10^{18}$ atoms/cm$^3$ and less than or equal to $1 \times 10^{22}$ atoms/cm$^3$, greater than or equal to $1 \times 10^{19}$ atoms/cm$^3$ and less than or equal to $1 \times 10^{21}$ atoms/cm$^3$, or greater than or equal to $5 \times 10^{19}$ atoms/cm$^3$ and less than or equal to $5 \times 10^{20}$ atoms/cm$^3$.

The concentrations of the impurity element in the regions 623b and 623c are higher than those in the regions 623a and 623d in the case where the impurity element is hydrogen. Note that the concentrations of hydrogen in the regions 623b and 623c which are measured by SIMS can be greater than or equal to $8 \times 10^{19}$ atoms/cm$^3$, greater than or equal to $1 \times 10^{20}$ atoms/cm$^3$, or greater than or equal to $5 \times 10^{20}$ atoms/cm$^3$.

Since the regions 623b and 623c contain the impurity element, oxygen vacancies and carrier densities of the regions 623b and 623c are increased. As a result, the region 623b and the region 623c have higher conductivity and serve as low-resistance regions.

Note that the impurity element may be a combination of one or more of hydrogen, boron, carbon, nitrogen, fluorine, aluminum, silicon, phosphorus, and chlorine and one or more of rare gas elements. In that case, due to interaction between oxygen vacancies formed by the rare gas elements in the regions 623b and 623c and one or more of hydrogen, boron, carbon, nitrogen, fluorine, aluminum, silicon, phosphorus, and chlorine added to the above regions, the conductivity of the regions 623b and 623c might be further increased.

The region 623d serves as a channel.

A region of the insulating film 624 overlapping with the oxide semiconductor film 623 and the conductive film 627 functions as a gate insulating film. In addition, a region of the insulating film 624 overlapping with the oxide semiconductor film 623 and the conductive films 625 and 626 functions as an interlayer insulating film.

The conductive film 625 and the conductive film 626 serve as a source and a drain. The conductive film 627 serves as a gate.

In the manufacturing process of the driving transistor 600F described in this embodiment, the conductive film 627 serving as a gate and the conductive films 625 and 626 serving as a source and a drain are formed at the same time. Therefore, in the driving transistor 600F, the conductive film 627 does not overlap with the conductive films 625 and 626, and parasitic capacitance formed between the conductive film 627 and each of the conductive films 625 and 626 can be reduced. As a result, in the case where a large-sized substrate is used as the substrate 621, signal delays in the conductive films 625 and 626 and the conductive film 627 can be reduced.

In addition, in the driving transistor 600F, the impurity element is added to the oxide semiconductor film 623 using the conductive films 625 and 626 and the conductive film 627 as masks. That is, the low-resistance regions can be formed in a self-aligned manner.

The substrate 601 illustrated in FIGS. 9A and 9B can be used as appropriate as the substrate 621.

As the insulating film 622, the insulating film 611 illustrated in FIGS. 9A and 9B can be used as appropriate.

The oxide semiconductor films 603 and 612 illustrated in FIGS. 9A and 9B can be used as appropriate as the oxide semiconductor film 623.

The insulating films 606 and 617 illustrated in FIGS. 9A and 9B can be used as appropriate as the insulating film 624.

Since the conductive films 625 and 626 and the conductive film 627 are formed at the same time, they are formed using the same material and have the same stacked-layer structure.

The conductive films 614 and 616, the conductive film 618, the conductive films 604 and 605, the conductive film 602, and the conductive film 607 illustrated in FIGS. 9A and 9B can be used as appropriate as the conductive films 625 and 626 and the conductive film 627.

The insulating film 628 can be formed with a single layer or a stack using one or more of an oxide insulating film and a nitride insulating film. Note that an oxide insulating film is preferably used for at least a region of the insulating film 628 that is in contact with the oxide semiconductor film 623, in order to improve characteristics of the interface with the oxide semiconductor film 623. An oxide insulating film that releases oxygen by being heated is preferably used as the insulating film 628, in which case oxygen contained in the insulating film 628 can be moved to the oxide semiconductor film 623 by heat treatment.

The insulating film 628 can be formed with a single layer or a stack using, for example, one or more of silicon oxide, silicon oxynitride, silicon nitride oxide, silicon nitride, aluminum oxide, hafnium oxide, gallium oxide, a Ga—Zn oxide, and the like.

It is preferable that the insulating film 629 be a film functioning as a barrier film against hydrogen, water, or the like from the outside. The insulating film 629 can be formed with a single layer or a stack using, for example, one or more of silicon nitride, silicon nitride oxide, aluminum oxide, and the like.

The thicknesses of the insulating films 628 and 629 each can be greater than or equal to 30 nm and less than or equal to 500 nm, or greater than or equal to 100 nm and less than or equal to 400 nm.

Like the transistor 600B illustrated in FIGS. 9A and 9B, the driving transistor 600F can have a dual-gate structure in which a conductive film is provided below the insulating film 622 so as to overlap with the oxide semiconductor film 623.

<Structure Example 5 of Transistor>

Next, another structure of the transistor included in the display device is described with reference to FIGS. 16A to 16C and FIGS. 17A and 17B.

Figure 16A:
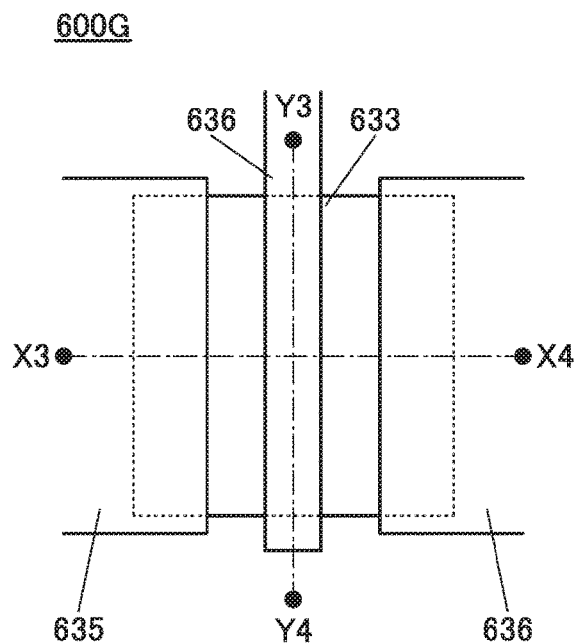
FIGS. 16A to 16C are a top view and cross-sectional views of a transistor.
Figure 16B:
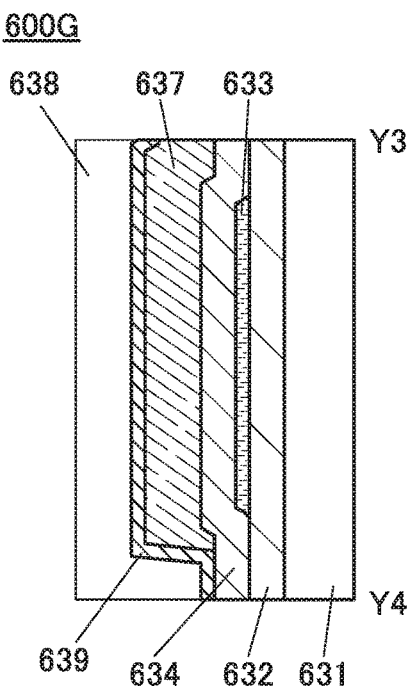
Figure 16C:
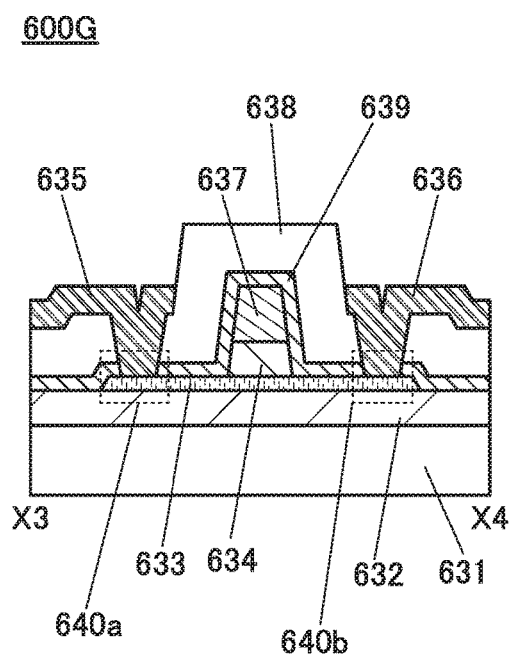

FIGS. 16A to 16C are a top view and cross-sectional views of a transistor 600G included in the display device. FIG. 16A is a top view of the transistor 600G, FIG. 16B is a cross-sectional view taken along the dashed-dotted line Y3-Y4 in FIG. 16A, and FIG. 16C is a cross-sectional view taken along the dashed-dotted line X3-X4 in FIG. 16A.

The transistor 600G illustrated in FIGS. 16A to 16C includes an oxide semiconductor film 633 over an insulating film 632 formed over a substrate 631, an insulating film 634 in contact with the oxide semiconductor film 633, a conductive film 637 overlapping with the oxide semiconductor film 633 with the insulating film 634 provided therebetween, an insulating film 639 in contact with the oxide semiconductor film 633, an insulating film 638 formed over the insulating film 639, a conductive film 635 in contact with the oxide semiconductor film 633 in an opening 640a formed in the insulating films 638 and 639, and a conductive film 636 in contact with the oxide semiconductor film 633 in an opening 640b formed in the insulating films 638 and 639.

The conductive film 637 of the transistor 600G serves as a gate. The conductive film 635 and the conductive film 636 serve as a source and a drain.

Regions of the oxide semiconductor film 633 overlapping with neither the conductive films 635 and 636 nor the conductive film 637 each include an element that forms an oxygen vacancy. An element that forms an oxygen vacancy is described below as an impurity element. Typical examples of the impurity element are hydrogen, boron, carbon, nitrogen, fluorine, aluminum, silicon, phosphorus, chlorine, a rare gas element, and the like. Typical examples of the rare gas element are helium, neon, argon, krypton, and xenon.

When the impurity element is added to the oxide semiconductor film, a bond between a metal element and oxygen in the oxide semiconductor film is cut, whereby an oxygen vacancy is formed. When the impurity element is added to the oxide semiconductor film, oxygen bonded to a metal element in the oxide semiconductor film is bonded to the impurity element, whereby oxygen is detached from the metal element and accordingly an oxygen vacancy is formed. As a result, the oxide semiconductor film has a higher carrier density and thus the conductivity thereof becomes higher.

Figure 17A:
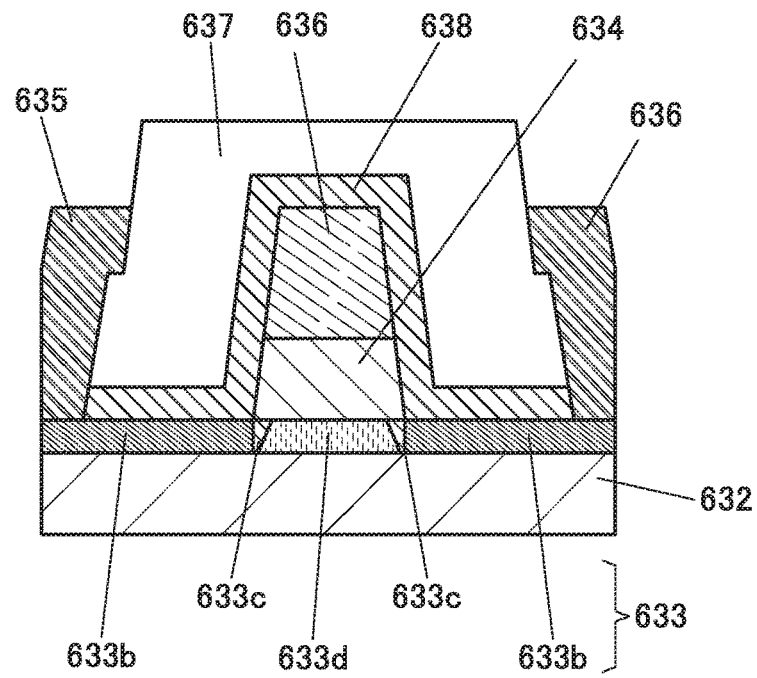
FIGS. 17A and 17B are each a cross-sectional view of a transistor.
Figure 17B:
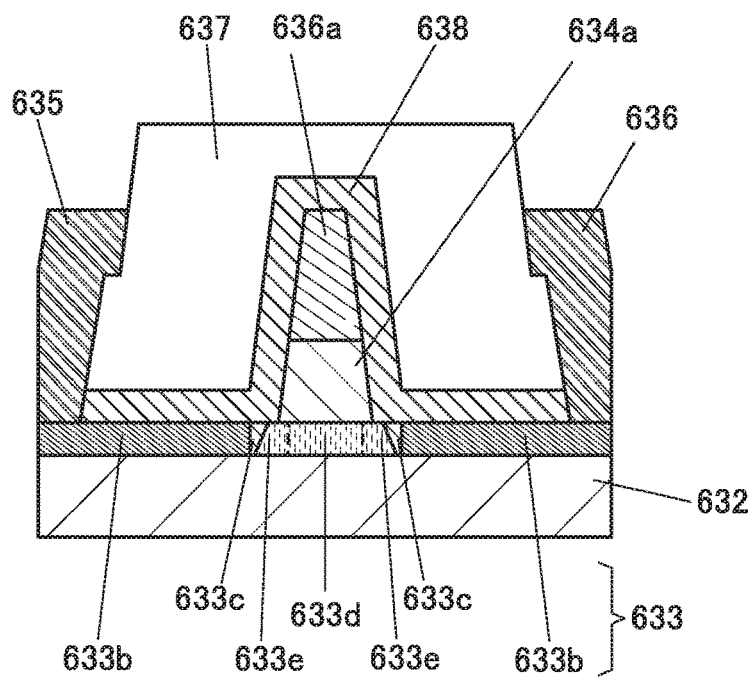

Here, FIG. 17A is a partial enlarged view of the oxide semiconductor film 633. As illustrated in FIG. 17A, the oxide semiconductor film 633 includes regions 633b in contact with the conductive films 635 and 636 or the insulating film 638 and a region 633d in contact with the insulating film 634. Note that in the case where the conductive film 637 has a tapered side surface, the oxide semiconductor film 633 may include regions 633c overlapping with a tapered portion of the conductive film 637.

The regions 633b function as low-resistance regions. The regions 633b contain at least a rare gas element and hydrogen as impurity elements. Note that in the case where the side surface of the conductive film 637 has a tapered shape, the impurity element is added to the regions 633c through the tapered portion of the conductive film 637; therefore, the regions 633c contain the impurity element, although the concentration of the rare gas element, which is an example of the impurity element, in the regions 633c is lower than that in the regions 633b. With the regions 633c, source-drain breakdown voltage of the transistor can be increased.

In the case where the oxide semiconductor film 633 is formed by a sputtering method, the regions 633b to 633d each contain the rare gas element, and the concentrations of the rare gas elements in the regions 633b and 633c are higher than those in the region 633d. This is due to the fact that in the case where the oxide semiconductor film 633 is formed by a sputtering method, the rare gas element is contained in the oxide semiconductor film 633 because the rare gas element is used as a sputtering gas and the rare gas element is intentionally added to the oxide semiconductor film 633 in order to form oxygen vacancies in the regions 633b and 633c. Note that a rare gas element different from that in the region 633d may be added to the regions 633b and 633c.

Since the region 633b is in contact with the insulating film 638, the hydrogen concentration in the region 633b is higher than that in the region 633d. In addition, in the case where hydrogen is diffused from the region 633b to the region 633c, the hydrogen concentration in the region 633c is higher than that in the region 633d. Note that the hydrogen concentration in the region 633b is higher than that in the region 633c.

In the regions 633b and 633c, the concentrations of hydrogen measured by secondary ion mass spectrometry (SIMS) can be greater than or equal to $8 \times 10^{19}$ atoms/cm$^3$, greater than or equal to $1 \times 10^{20}$ atoms/cm$^3$, or greater than or equal to $5 \times 10^{20}$ atoms/cm$^3$. Note that the concentration of hydrogen in the region 633d which is measured by secondary ion mass spectrometry can be less than or equal to $5 \times 10^{19}$ atoms/cm$^3$, less than or equal to $1 \times 10^{19}$ atoms/cm$^3$, less than or equal to $5 \times 10^{18}$ atoms/cm$^3$, less than or equal to $1 \times 10^{18}$ atoms/cm$^3$, less than or equal to $5 \times 10^{17}$ atoms/cm$^3$, or less than or equal to $1 \times 10^{16}$ atoms/cm$^3$.

In the case where boron, carbon, nitrogen, fluorine, aluminum, silicon, phosphorus, or chlorine is added to the oxide semiconductor film 633 as an impurity element, only the regions 633b and 633c contain the impurity element. Therefore, the concentrations of the impurity element in the regions 633b and 633c are higher than that in the region 633d. Note that the concentrations of the impurity element in the regions 633b and 633c which are measured by secondary ion mass spectrometry can be greater than or equal to $1 \times 10^{18}$ atoms/cm$^3$ and less than or equal to $1 \times 10^{22}$ atoms/cm$^3$, greater than or equal to $1 \times 10^{19}$ atoms/cm$^3$ and less than or equal to $1 \times 10^{21}$ atoms/cm$^3$, or greater than or equal to $5 \times 10^{19}$ atoms/cm$^3$ and less than or equal to $5 \times 10^{20}$ atoms/cm$^3$.

The regions 633b and 633c have higher concentrations of hydrogen and larger amounts of oxygen vacancies due to addition of the rare gas element than the region 633d. Therefore, the regions 633b and 633c have higher conductivity and serve as low-resistance regions. The resistivity of the regions 633b and 633c can be typically greater than or equal to $1 \times 10^{-3}$ Ωcm and less than $1 \times 10^{4}$ Ωcm, or greater than or equal to $1 \times 10^{-3}$ Ωcm and less than $1 \times 10^{-1}$ Ωcm.

Note that when the amount of hydrogen in each of the regions 633b and 633c is the same as or smaller than the amount of oxygen vacancies therein, hydrogen is easily captured by oxygen vacancies and is less likely to be diffused to the region 633d serving as a channel. As a result, a transistor having normally-off characteristics can be obtained.

The region 633d serves as a channel.

In addition, after the impurity element is added to the oxide semiconductor film 633 using the conductive film 637 as a mask, the area of the conductive film 637 when seen from the above may be reduced. This can be performed in such a manner that a slimming process is performed on a mask over the conductive film 637 in a step of forming the conductive film 637 so as to obtain a mask with a minuter structure. Then, the conductive film 637 and the insulating film 634 are etched using the mask, so that a conductive film 637a and an insulating film 634a illustrated in FIG. 17B can be formed. As the slimming process, an ashing process using an oxygen radical or the like can be employed, for example.

As a result, an offset region 633e is formed between the region 633c and the region 633d serving as a channel in the oxide semiconductor film 633. Note that the length of the offset region 633e in the channel length direction is set to be less than 0.1 µm, whereby a decrease in the on-state current of the transistor can be suppressed.

The substrate 601 illustrated in FIGS. 9A and 9B can be used as appropriate as the substrate 631 illustrated in FIGS. 16A to 16C.

The insulating film 611 illustrated in FIGS. 9A and 9B can be used as appropriate as the insulating film 632 illustrated in FIGS. 16A to 16C.

The oxide semiconductor films 603 and 612 illustrated in FIGS. 9A and 9B can be used as appropriate as the oxide semiconductor film 633 illustrated in FIGS. 16A to 16C.

The insulating films 606 and 617 illustrated in FIGS. 9A and 9B can be used as appropriate as the insulating film 634 illustrated in FIGS. 16A to 16C.

The conductive films 614 and 616, the conductive film 618, the conductive films 604 and 605, the conductive film 602, and the conductive film 607 illustrated in FIGS. 9A and 9B can be used as appropriate as the conductive films 635 and 636 and the conductive film 637 illustrated in FIGS. 16A to 16C.

The thicknesses of the insulating films 637 and 638 each can be greater than or equal to 30 nm and less than or equal to 500 nm, or greater than or equal to 100 nm and less than or equal to 400 nm.

In the transistor 600G, the conductive film 637 does not overlap with the conductive films 635 and 636, and parasitic capacitance formed between the conductive film 637 and each of the conductive films 635 and 636 can be reduced. As a result, in the case where a large-sized substrate is used as the substrate 631, signal delays in the conductive films 635 and 636 and the conductive film 637 can be reduced.

In addition, in the transistor 600G, the impurity element is added to the oxide semiconductor film 633 using the conductive film 637 as a mask. That is, the low-resistance regions can be formed in a self-aligned manner.

Like the transistor 600B illustrated in FIGS. 9A and 9B, the transistor 600G can have a dual-gate structure in which a conductive film is provided below the insulating film 632 so as to overlap with the oxide semiconductor film 633.

Note that a transistor that can be used as each of the first to fourth transistors 101 to 104 in FIG. 2A is not limited to any of the above transistors. The structure described above in this embodiment can be combined as appropriate with any of the structures described in the other embodiments.

(Embodiment 3)

Figure 19:
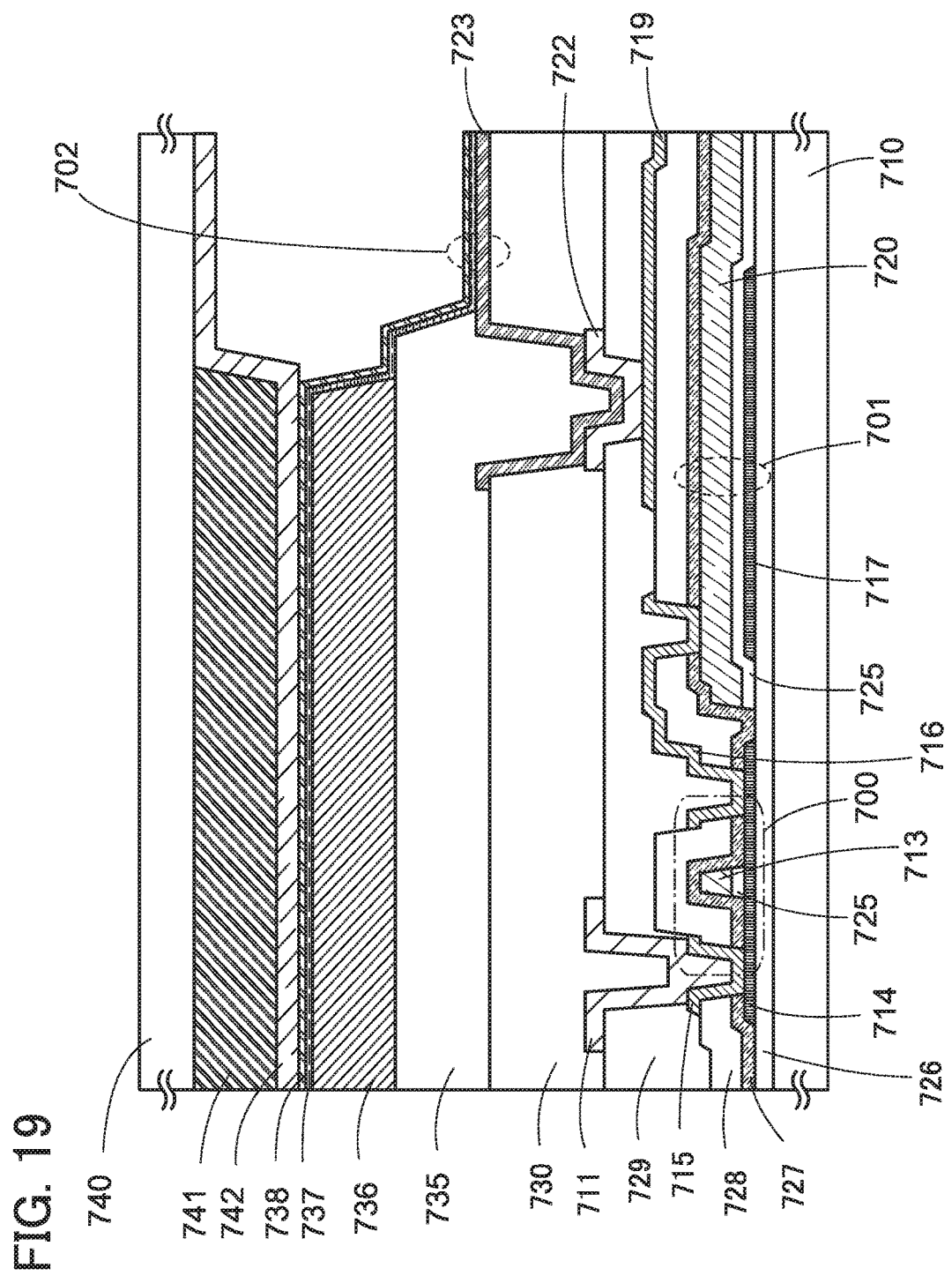
FIG. 19 is a cross-sectional view of a display device.

An example of a cross-sectional view of a display pixel of a display device will be described in this embodiment. FIG. 19 illustrates a cross-sectional structure of a transistor 700, a capacitor 701, and a display element 702 in the display pixel 503.

Specifically, the display device illustrated in FIG. 19 includes an insulating film 726 over a substrate 710, and the transistor 700 and the capacitor 701 over the insulating film 726. The transistor 700 includes a semiconductor film 714, an insulating film 725 over the semiconductor film 714, a conductive film 713 overlapping with the semiconductor film 714 with the insulating film 725 provided therebetween and functioning as a gate, a conductive film 715 which is in contact with the semiconductor film 714 and is provided in an opening formed in an insulating film 727 and an insulating film 728, and a conductive film 716 which is similarly in contact with the semiconductor film 714 and is provided in an opening formed in the insulating films 727 and 728. Note that the conductive films 715 and 716 function as a source and a drain of the transistor 700.

The capacitor 701 includes a semiconductor film 717 functioning as an electrode, the insulating film 725 over the semiconductor film 717, and a conductive film 720 overlapping with the semiconductor film 717 with the insulating film 725 provided therebetween and functioning as an electrode.

The insulating film 725 may be formed with a single layer or a stack of an insulating film containing one or more of aluminum oxide, aluminum oxynitride, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, and tantalum oxide. Note that in this specification, oxynitride contains more oxygen than nitrogen, and nitride oxide contains more nitrogen than oxygen.

In the case where an oxide semiconductor is used for the semiconductor film 714, it is preferable to use, for the insulating film 726, a material that can supply oxygen to the semiconductor film 714. By using the material for the insulating film 726, oxygen contained in the insulating film 726 can be moved to the semiconductor film 714, and the amount of oxygen vacancies in the semiconductor film 714 can be reduced. Oxygen contained in the insulating film 726 can be moved to the semiconductor film 714 efficiently by heat treatment performed after the semiconductor film 714 is formed.

The insulating film 727 is provided over the semiconductor film 714 and the conductive films 713 and 720; the insulating film 728 is provided over the insulating film 727; and the conductive films 715 and 716 and a conductive film 719, and an insulating film 729 are provided over the insulating film 728. Conductive films 711 and 722 are provided over the insulating film 729, the conductive film 711 is connected to the conductive film 715 in an opening formed in the insulating film 729, and the conductive film 722 is connected to the conductive film 719 in an opening formed in the insulating film 729.

In the case where an oxide semiconductor is used for the semiconductor film 714, the insulating film 727 preferably has a function of blocking oxygen, hydrogen, water, an alkali metal, an alkaline earth metal, and the like. It is possible to prevent outward diffusion of oxygen from the semiconductor film 714 and entry of hydrogen, water, or the like into the semiconductor film 714 from the outside by providing the insulating film 727. The insulating film 727 can be formed using a nitride insulating film, for example. As the nitride insulating film, a silicon nitride film, a silicon nitride oxide film, an aluminum nitride film, an aluminum nitride oxide film, and the like can be given. Note that instead of the nitride insulating film having a blocking effect against oxygen, hydrogen, water, an alkali metal, an alkaline earth metal, and the like, an oxide insulating film having a blocking effect against oxygen, hydrogen, water, and the like may be provided. As the oxide insulating film having a blocking effect against oxygen, hydrogen, water, and the like, an aluminum oxide film, an aluminum oxynitride film, a gallium oxide film, a gallium oxynitride film, an yttrium oxide film, an yttrium oxynitride film, a hafnium oxide film, a hafnium oxynitride film, and the like can be given.

An insulating film 730 and a conductive film 723 are provided over the insulating film 729 and the conductive films 711 and 722, and the conductive film 723 is connected to the conductive film 722 in an opening formed in the insulating film 730.

An insulating film 735 is provided over the insulating film 730 and the conductive film 723. The insulating film 735 has an opening in a region overlapping with the conductive film 723. Over the insulating film 735, an insulating film 736 is provided in a region different from the opening of the insulating film 735. An EL layer 737 and a conductive film 738 are sequentially stacked over the insulating films 735 and 736. A portion in which the conductive films 723 and 738 overlap with each other with the EL layer 737 provided therebetween functions as the display element 702. One of the conductive films 723 and 738 functions as an anode, and the other functions as a cathode.

The display device includes a substrate 740 that faces the substrate 710 with the display element 702 provided therebetween. A blocking film 741 having a function of blocking light is provided under the substrate 740, i.e., on a surface of the substrate 740 that is closer to the display element 702. The blocking film 741 has an opening in a region overlapping with the display element 702. In the opening overlapping with the display element 702, a coloring layer 742 that transmits visible light in a specific wavelength range is provided under the substrate 740.

Note that the insulating film 736 is provided to adjust the distance between the display element 702 and the substrate 740 and may be omitted in some cases.

Although the top-emission structure is employed in this embodiment in which light of the display element 702 is extracted from the side opposite to the element substrate, a bottom-emission structure in which light of the display element 702 is extracted from the element substrate side or a dual-emission structure in which light of the display element 702 is extracted from both the element substrate side and the side opposite to the element substrate can also be applied to embodiments of the present invention.

The structure described above in this embodiment can be combined as appropriate with any of the structures described in the other embodiments.

(Embodiment 4)

In this embodiment, a display module and an electronic device that can be formed using the display device described in the above embodiment will be described.

<External View of Display Device

Figure 20:
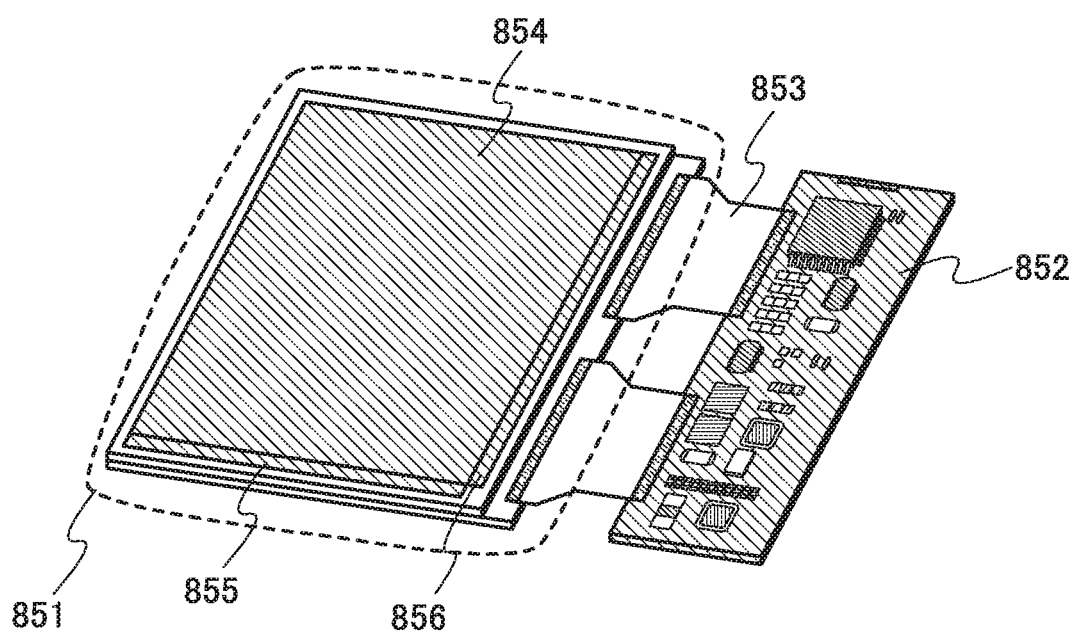
FIG. 20 is a perspective view of a display device.

FIG. 20 is a perspective view illustrating an example of an external view of a display device. The display device in FIG. 20 includes a panel 851; a circuit board 852 including a controller, a power supply circuit, an image processing circuit, an image memory, a CPU, and the like; and a connection portion 853. The panel 851 includes a pixel portion 854 including a plurality of pixels, a driver circuit 855 that selects pixels row by row, and a driver circuit 856 that controls input of an image signal IMG to the pixels in a selected row.

A variety of signals and power supply potentials are input from the circuit board 852 to the panel 851 through the connection portion 853. As the connection portion 853, a flexible printed circuit (FPC) or the like can be used. In the case where a COF tape is used as the connection portion 853, part of circuits in the circuit board 852 or part of the driver circuit 855 or the driver circuit 856 included in the panel 851 may be formed on a chip separately prepared, and the chip may be electrically connected to the COF tape by a chip-on-film (COF) method.

<Structural Example of Electronic Device>

The display device described in the above embodiment can be used for display devices, laptops, or image reproducing devices provided with recording media (typically devices which reproduce the content of recording media such as digital versatile discs (DVDs) and have displays for displaying the reproduced images). In addition to the above examples, as an electronic device which can include the display device described in the above embodiment, mobile phones, portable game machines, portable information terminals, e-book readers, cameras such as video cameras and digital still cameras, goggle-type displays (head mounted displays), navigation systems, audio reproducing devices (e.g., car audio components and digital audio players), copiers, facsimiles, printers, multifunction printers, automated teller machines (ATM), vending machines, and the like can be given. FIG. 21A to FIG. 21F show specific examples of these electronic devices.

Figure 21A:
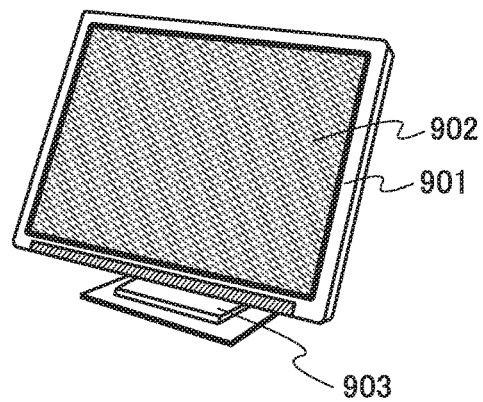
FIGS. 21A to 21F each illustrate an electronic device.

FIG. 21A illustrates a display device including a housing 901, a display portion 902, a supporting base 903, and the like. The display device described in the above embodiment can be used for the display portion 902. Note that a display device includes all display devices for displaying information, such as display devices for personal computers, for receiving television broadcast, and for displaying advertisement, in its category.

Figure 21B:
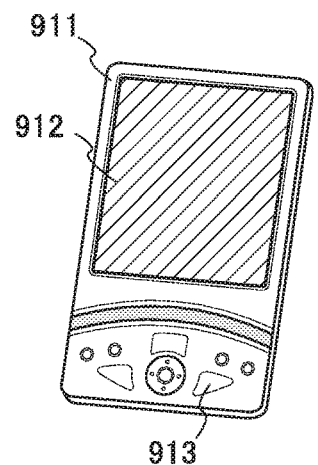

FIG. 21B illustrates a portable information terminal including a housing 911, a display portion 912, an operation key 913, and the like. The display device described in the above embodiment can be used for the display portion 912.

Figure 21C:
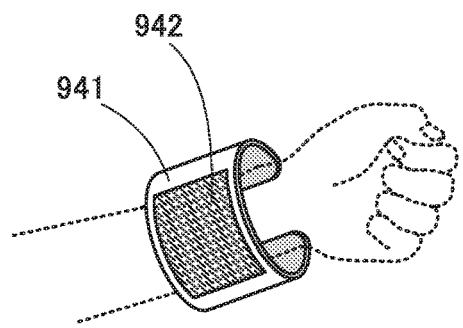

FIG. 21C illustrates a display device including a housing 941 having a curved surface, a display portion 942, and the like. When a flexible substrate is used in the display device described in the above embodiment, it is possible to use the display device for the display portion 942 supported by the housing 941 having a curved surface. Consequently, it is possible to provide a user-friendly display device that is flexible and lightweight.

Figure 21D:
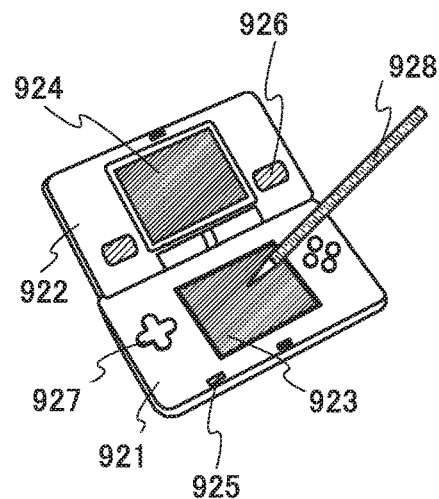

FIG. 21D illustrates a portable game machine including a housing 921, a housing 922, a display portion 923, a display portion 924, a microphone 925, speakers 926, an operation key 927, a stylus 928, and the like. The display device described in the above embodiment can be used for the display portion 923 or the display portion 924. When the display device described in the above embodiment is used for the display portion 923 or 924, it is possible to provide a user-friendly portable game machine with quality that hardly deteriorates. Although the portable game machine illustrated in FIG. 21D includes the two display portions 923 and 924, the number of display portions included in the portable game machines is not limited to two.

Figure 21E:
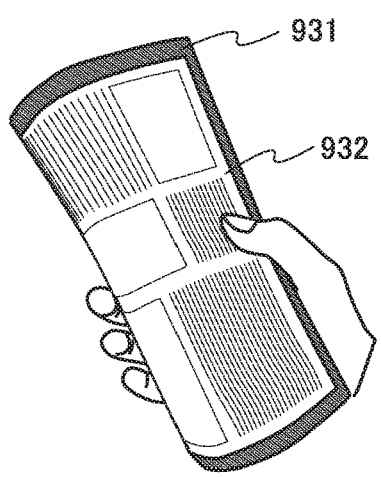

FIG. 21E illustrates an e-book reader including a housing 931, a display portion 932, and the like. The display device described in the above embodiment can be used for the display portion 932. When a flexible substrate is used, the display device can have flexibility, so that it is possible to provide a user-friendly e-book reader that is flexible and lightweight.

Figure 21F:
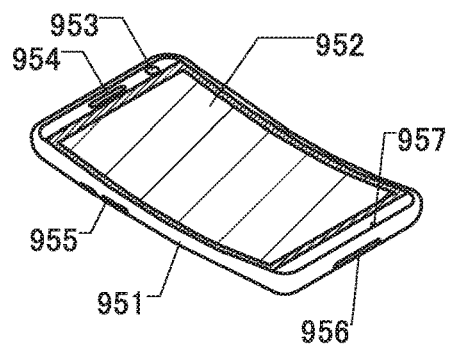

FIG. 21F illustrates a mobile phone including a display portion 952, a microphone 957, a speaker 954, a camera 953, an external connection port 956, and an operation button 955 in a housing 951. The display device described in the above embodiment can be used for the display portion 952. When the display device described in the above embodiment is provided over a flexible substrate, the display device can be used for the display portion 952 having a curved surface, as illustrated in FIG. 21F.

The structure described above in this embodiment can be combined as appropriate with any of the structures described in the other embodiments.

This application is based on Japanese Patent Application serial no. 2015-043113 filed with Japan Patent Office on Mar. 5, 2015, the entire contents of which are hereby incorporated by reference.

What is claimed is:

1. A semiconductor device comprising:
a first D/A converter;
a second D/A converter;
a first transistor comprising a first gate and a second gate overlapping with each other with a semiconductor film there between, a source and a drain;
a second transistor connected to the first gate;
a third transistor connected to the second gate;
a first wiring connected to the second transistor and the first D/A converter;
a second wiring connected to the third transistor and the second D/A converter; and
a display element connected to one of the source and the drain of the first transistor,
wherein the first D/A converter includes $2^{N-k}$ gray level power supply lines,
wherein the second D/A converter includes $2^k$ gray level power supply lines,
wherein the first gate is supplied with one of $2^{N-k}$ electric potentials from the first D/A converter,
wherein the second gate is supplied with one of $2^k$ electric potentials from the second D/A converter,
wherein the display element performs display with $2^N$ gray levels, and
wherein N is an integer greater than or equal to 1, and k is an integer greater than or equal to 1 and less than or equal to (N−1).

2. The semiconductor device according to claim 1,
wherein a potential applied to one of the $2^{N-k}$ gray level power supply lines is configured to be supplied to the first gate, and
wherein a potential applied to one of the $2^k$ gray level power supply lines is configured to be supplied to the second gate.

3. A semiconductor device comprising:
a first D/A converter;
a second D/A converter; and
a plurality of pixels,
wherein the plurality of pixels each comprise:
a first transistor;
a second transistor;
a third transistor comprising a first gate and a second gate overlapping with each other with a semiconductor film therebetween;
a display element connected to the third transistor,
wherein the first D/A converter includes $2^{N-k}$ gray level power supply lines,
wherein the second D/A converter includes $2^k$ gray level power supply lines,
wherein the first D/A converter is configured to output $2^{N-k}$ electric potentials,
wherein the second D/A converter is configured to output $2^k$ electric potentials,
wherein an output from the first D/A converter is configured to be supplied to the first gate through the first transistor,
wherein an output from the second D/A converter is configured to be supplied to the second gate through the second transistor,
wherein the display element performs display with $2^N$ gray levels, and
wherein N is an integer greater than or equal to 1, and k is an integer greater than or equal to 1 and less than or equal to (N−1).

4. The semiconductor device according to claim 3, further comprising:
a fourth transistor;
a first capacitor;
a second capacitor;
a first wiring;
a second wiring;
a third wiring; and
a fourth wiring,
wherein a gate of the first transistor is connected to the first wiring, one of a source and a drain of the first transistor is connected to the second wiring, and the other of the source and the drain of the first transistor is connected to the first gate,
wherein a gate of the second transistor is connected to the first wiring, one of a source and a drain of the second transistor is connected to the third wiring, and the other of the source and the drain of the second transistor is connected to the second gate,
wherein one of a source and a drain of the third transistor is connected to the display element,
wherein a gate of the fourth transistor is connected to the first wiring, one of a source and a drain of the fourth transistor is connected to the fourth wiring, and the other of the source and the drain of the fourth transistor is connected to the one of the source and the drain of the third transistor,
wherein one of electrodes of the first capacitor is connected to the first gate, and the other of the electrodes of the first capacitor is connected to the one of the source and the drain of the third transistor,
wherein one of electrodes of the second capacitor is connected to the second gate, and the other of the electrodes of the second capacitor is connected to the one of the source and the drain of the third transistor, and
wherein the first transistor, the second transistor, the third transistor, and the fourth transistor are each an n-channel transistor.

5. The semiconductor device according to claim 3, further comprising:
a fourth transistor;
a first capacitor;
a second capacitor;
a first wiring;
a second wiring;
a third wiring;
a fourth wiring; and
a fifth wiring,
wherein a gate of the first transistor is connected to the first wiring, one of a source and a drain of the first transistor is connected to the second wiring, and the other of the source and the drain of the first transistor is connected to the first gate, wherein a gate of the second transistor is connected to the third wiring, one of a source and a drain of the second transistor is connected to the second wiring, and the other of the source and the drain of the second transistor is connected to the second gate, wherein one of a source and a drain of the third transistor is connected to the display element, wherein a gate of the fourth transistor is connected to the fourth wiring, one of a source and a drain of the fourth transistor is connected to the fifth wiring, and the other of the source and the drain of the fourth transistor is connected to the one of the source and the drain of the third transistor, wherein one of electrodes of the first capacitor is connected to the first gate, and the other of the electrodes of the first capacitor is connected to the one of the source and the drain of the third transistor, wherein one of electrodes of the second capacitor is connected to the second gate, and the other of the electrodes of the second capacitor is connected to the one of the source and the drain of the third transistor, and wherein the first transistor, the second transistor, the third transistor, and the fourth transistor are each an n-channel transistor.

6. The semiconductor device according to claim 3, further comprising:
a first capacitor;
a second capacitor;
a first wiring;
a second wiring; and
a third wiring, wherein a gate of the first transistor is connected to the first wiring, one of a source and a drain of the first transistor is connected to the second wiring, and the other of the source and the drain of the first transistor is connected to the first gate, wherein a gate of the second transistor is connected to the first wiring, one of a source and a drain of the second transistor is connected to the third wiring, and the other of the source and the drain of the second transistor is connected to the second gate, wherein one of a source and a drain of the third transistor is connected to the display element, wherein one of electrodes of the first capacitor is connected to the first gate, and the other of the electrodes of the first capacitor is connected to the other of the source and the drain of the third transistor, wherein one of electrodes of the second capacitor is connected to the second gate, and the other of the electrodes of the second capacitor is connected to the other of the source and the drain of the third transistor, and wherein the first transistor, the second transistor, and the third transistor are each a p-channel transistor.

7. The semiconductor device according to claim 3, further comprising:
a first capacitor;
a second capacitor;
a first wiring;
a second wiring; and
a third wiring, wherein a gate of the first transistor is connected to the first wiring, one of a source and a drain of the first transistor is connected to the second wiring, and the other of the source and the drain of the first transistor is connected to the first gate, wherein a gate of the second transistor is connected to the third wiring, one of a source and a drain of the second transistor is connected to the second wiring, and the other of the source and the drain of the second transistor is connected to the second gate, wherein one of a source and a drain of the third transistor is connected to the display element, wherein one of electrodes of the first capacitor is connected to the first gate, and the other of the electrodes of the first capacitor is connected to the other of the source and the drain of the third transistor, wherein one of electrodes of the second capacitor is connected to the second gate, and the other of the electrodes of the second capacitor is connected to the other of the source and the drain of the third transistor, and wherein the first transistor, the second transistor, and the third transistor are each a p-channel transistor.

8. The semiconductor device according to claim 3,
wherein a potential applied to one of the $2^{N-k}$ gray level power supply lines is configured to be supplied to the first gate, and wherein a potential applied to one of the $2^k$ gray level power supply lines is configured to be supplied to the second gate.

9. A method for driving a semiconductor device, comprising:
supplying a first potential to a first gate of a first transistor, the first potential being one of $2^{N-k}$ electric potentials from a first D/A converter;

supplying a second potential to a second gate overlapping with the first gate with a semiconductor film of the first transistor therebetween, the second potential being one of $2^k$ electric potentials from a second D/A converter; and controlling a gray level value of a display element connected to the first transistor by the first potential and the second potential, wherein N is an integer greater than or equal to 1, and k is an integer greater than or equal to 1 and less than or equal to (N−1), wherein the first D/A converter includes $2^{N-k}$ gray level power supply lines, wherein the second D/A converter includes $2^k$ gray level power supply lines, and wherein the display element performs display with $2^N$ gray levels.

10. The method for driving the semiconductor device according to claim 9,
wherein the first potential is applied to one of the $2^{N-k}$ gray level power supply lines, and wherein the second potential is applied to one of the $2^k$ gray level power supply lines.

* * * * *